(12) United States Patent
Wang et al.

(10) Patent No.: US 10,796,084 B2
(45) Date of Patent: Oct. 6, 2020

(54) METHODS, SYSTEMS, AND ARTICLES OF MANUFACTURE FOR AUTOMATIC FILL OR COMPLETION FOR APPLICATION SOFTWARE AND SOFTWARE SERVICES

(71) Applicant: INTUIT INC., Mountain View, CA (US)

(72) Inventors: Gang Wang, San Diego, CA (US); Massimo Mascaro, San Diego, CA (US); Saneesh Joseph, San Diego, CA (US); Arien C. Ferrell, Sunnyvale, CA (US); Michael J. Graves, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 142 days.

(21) Appl. No.: 15/011,379

(22) Filed: Jan. 29, 2016

(65) Prior Publication Data

US 2017/0220540 A1    Aug. 3, 2017

(51) Int. Cl.
*G06F 40/174*    (2020.01)
*G06F 40/40*    (2020.01)

(52) U.S. Cl.
CPC ............ *G06F 40/174* (2020.01); *G06F 40/40* (2020.01)

(58) Field of Classification Search
CPC ...... G06F 17/28; G06F 17/243; G06F 40/174; G06F 40/40
USPC ........................................................ 715/266
See application file for complete search history.

(56) References Cited

U.S. PATENT DOCUMENTS

| 7,685,144 | B1 * | 3/2010 | Katragadda | ........... G06F 3/0237 707/999.101 |
| 9,195,703 | B1 * | 11/2015 | Kirmse | ................. G06Q 10/02 |
| 2005/0108344 | A1 | 5/2005 | Tafoya et al. | |
| 2005/0257148 | A1 * | 11/2005 | Goodman | ............. G06F 17/243 715/226 |
| 2009/0119575 | A1 * | 5/2009 | Velusamy | ............. G06F 17/243 715/226 |
| 2011/0029862 | A1 * | 2/2011 | Scott | ..................... G06F 3/0237 715/261 |

(Continued)

OTHER PUBLICATIONS

PCT International Search Report for PCT/US2017/014448, Applicant: Intuit Inc., Form PCT/ISA/210 and 220, dated Apr. 26, 2017 (5pages).

(Continued)

*Primary Examiner* — Stephen S Hong
*Assistant Examiner* — Broderick C Anderson
(74) *Attorney, Agent, or Firm* — DLA Piper LLP (US)

(57) ABSTRACT

A computing platform identifies one or more characteristics of a user accessing application software or a software service via a user interface and a field to be filled or completed in the user interface of the application software or a software service. The computing platform further determines and presents, at one or more automatic fill or completion modules that are stored at least partially in memory and function in tandem with one or more computer processors in the computing platform, a list of one or more completion candidates in the user interface of the application software or a software service at least by performing one or more incremental searches based in part or in whole upon the one or more characteristics. The field is then populated with a completion candidate from the list of one or more completion candidates.

23 Claims, 15 Drawing Sheets

(56) References Cited

U.S. PATENT DOCUMENTS

| | | | |
|---|---|---|---|
| 2013/0024185 A1 | 1/2013 | Parikh | |
| 2014/0258828 A1* | 9/2014 | Lymer | G06F 40/174 |
| | | | 715/224 |
| 2014/0280287 A1* | 9/2014 | Ganti | G06F 16/248 |
| | | | 707/766 |
| 2014/0324856 A1* | 10/2014 | Lahiani | G06Q 30/0631 |
| | | | 707/736 |

OTHER PUBLICATIONS

PCT Written Opinion of the International Search Authority for PCT/US2017/014448, Applicant: Intuit Inc., Form PCT/ISA/237, dated Apr. 26, 2017 (13pages).

\* cited by examiner

METHODS, SYSTEMS, AND ARTICLES OF MANUFACTURE FOR AUTOMATIC FILL OR COMPLETION FOR APPLICATION SOFTWARE AND SOFTWARE SERVICES

BACKGROUND

In using application software or software services locally installed on a client computer or remotely hosted on a server to produce an electronic document, a user often needs to manually enter a lot of information. For example, in using a locally installed or remotely hosted tax return preparation application software, a user may have to manually enter the personal information, dependent information, specifics about deductions, various types of income, etc. for the tax return preparation application software to perform various tasks to generated the 1040 and 540 forms for filing. As another example, in an accounting or finance application software, a user also needs to manually enter various types of information. Manual entry of information is not only tedious but also error prone.

Therefore, there exists a need for improved methods and systems for automatic fill or completion for application software and software services.

SUMMARY

Disclosed are various embodiments relating to methods, systems, and articles of manufacture for automatic fill or completion for application software and software services. Some embodiments are directed at a method for automatic fill or completion for application software and software services. The method invokes a computing platform that includes one or more servers that are communicatively connected via one or more network elements and identifies one or more characteristics of a user accessing an application software or a software service via a user interface. The computing platform further identifies a field to be filled or completed in the user interface of the application software or a software service. One or more automatic fill or completion modules that are stored at least partially in memory and function in tandem with one or more computer processors in the computing platform determine and present a list of one or more completion candidates in the user interface of the application software or a software service at least by performing one or more incremental searches based in part or in whole upon the one or more characteristics. The field may be populated with a completion candidate from the list of one or more completion candidates.

In some of these embodiments, a user profile may be identified, if already existing, or generated, if non-existing, for the user. The one or more characteristics may be identified from the user profile, and the corresponding one or more characteristics may be identified from a plurality of other users for the application software or a software service. In addition or in the alternative, one or more models and one or more libraries may be identified based in part or in whole upon the one or more characteristics of the user and information about the field to be filled or completed. In some of these embodiments, one or more data models that describe input data for filling or completing at least the field may be identified, and one or more predictor models that suggest or predict at least some of the list of one or more completion candidates may be identified as the one or more models based in part or in whole upon the one or more data models.

In some of these immediately preceding embodiments, the list of one or more completion candidates may be determined by performing the one or more incremental searches with the one or more predictor models. In addition or in the alternative, a user input that comprises at least one or more characters may be identified from the user via the user interface, and the list of one or more completion candidates may be determined at least by performing the one or more incremental searches with the one or more predictor models based in part or in whole upon the user input. In some of these immediately preceding embodiments, the field may be populated with the completion candidate from the list of one or more completion candidates based in part or in whole upon one or more result sets of the one or more incremental searches by the one or more predictor models and further based in part or in whole upon the user input.

In addition or in the alternative, an additional user input that comprises at least one or more additional characters may be identified from the user via the user interface. In some of these embodiments, the one or more predictor models in the computing platform may determine whether the list of one or more completion candidates is to be modified based in part or in whole upon the user input and the additional user input. In addition or in the alternative, the list of one or more completion candidates may be modified into a modified list of one or more completion candidates when it is determined that the list of one or more completion candidates is to be modified, and the modified list of one or more completion candidates may be presented in the user interface to the user for the field.

In some embodiments, the list of one or more completion candidates may be presented in the user interface to the user before the user provides any input for the field, and the filed may be populated with the completion candidate before the user provides any input for the field. In addition or in the alternative, a structured output may be generated in an electronic document that does not include any search engine results pages.

Some embodiments are directed at a method for automatic fill or completion for application software and software services. The method invokes a computing platform that includes one or more servers that are communicatively connected via one or more network elements and identifies one or more electronic files for a user accessing an application software or a software service via a user interface. One or more automatic fill or completion modules that are stored at least partially in memory and function in tandem with one or more computer processors in the computing platform identify user data at least by performing data curation for the one or more electronic files. One or more software application or software services may be identified for the one or more electronic files, and one or more fields for the one or more software application or software services may be populated with the user data identified from the data curation.

In some of these embodiments, the one or more automatic fill or completion modules may determine whether the one or more electronic files include recognizable contents that are understandable by the one or more automatic fill or completion modules. An electronic file may then be identified from the one or more electronic files, and the electronic file may be preprocessed when the electronic file is determined not to include the recognizable contents.

In some of these immediately preceding embodiments, a field may be identified in the electronic file. The semantics of the field may be determined, and the corresponding data for the field in the electronic file may be classified based in part or in whole upon the semantics. The corresponding data may be identified as a part of the user data at least by managing the corresponding data with one or more data structures. In addition or in the alternative, the corresponding data for the field may be validated at least by performing a consistency check for the field, and the corresponding data for the field may be updated when results of validating the corresponding data for the field indicate one or more inconsistencies.

In some embodiments, the data identified from the user data for the field may be validated at least by performing a consistency check for the field and presented for review or confirmation based in part or in whole upon results of validating the data. A machine learning module or an artificial intelligence module may be invoked to update one or more other modules in the one or more automatic fill or completion modules; and the field and the data populated into the field may be tracked in a data structure.

Some embodiments are directed at an apparatus for implementing various processes described herein. More details about the apparatus for implementing various processes will be described in some of the subsequent paragraphs with reference to one or more drawing figures.

Some embodiments are directed at an article of manufacture having stored thereupon a sequence of instructions which, when executed by a mobile communication device, causes the mobile communication device to perform various processes or to invoke various modules described herein. More details about the article of manufacture will be described in some of the subsequent paragraphs with reference to one or more drawing figures.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which.

Figure 1:
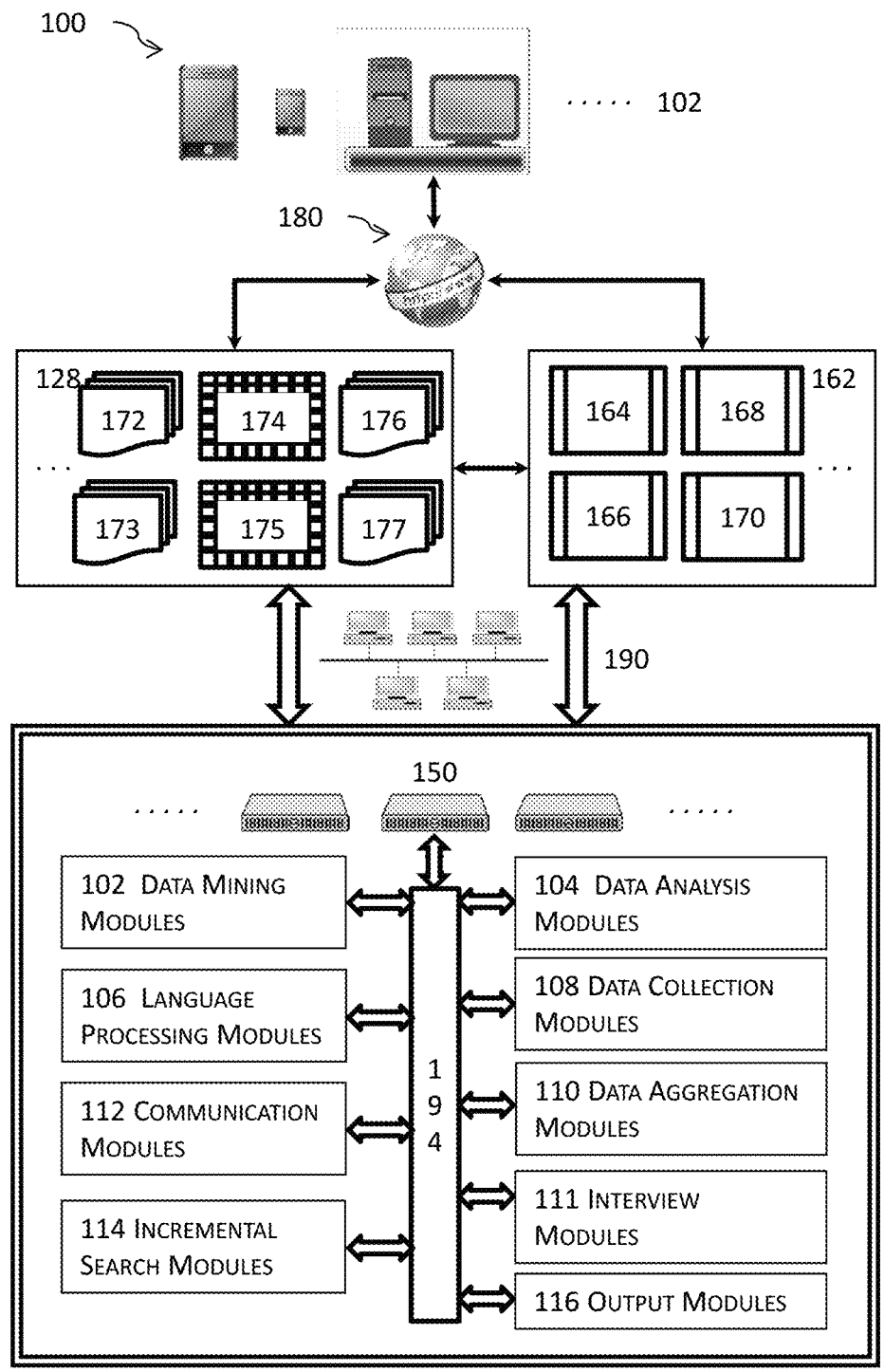
FIG. 1 illustrates a high level system diagram of a system that implements automatic fill or completion for application software and software services in some embodiments.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments.

DETAILED DESCRIPTION OF ILLUSTRATED EMBODIMENTS

In some embodiments, when a user interacts with application software or a software service to generate an electronic document, the electronic document may include one or more fields to be completed or filled. Some techniques described herein identify one or more characteristics of the user and perform a search to determine a list of one or more completion candidates based in part or in whole on the one or more characteristics. In some embodiments, the one or more characteristics of the user include one or more personal characteristics about the user.

For example, the one or more characteristics may include the marital status, the status of dependents, the residential location, the age, gross and/or taxable income level or amount, information about banking and investment institutions, and/or professional memberships, etc. The search may be incremental and utilize one or more modules described herein. For example, one or more predictor models may be used. The search may be performed against one or more relational databases with, for example, SQL queries, instead of any Web search queries that are commonly used in search engines to produce search engine results pages (SERPs).

In some of these embodiments, these one or more characteristics may be identified from a user profile created for the user. For example, a user's profile may be generated from the data extracted from one or more historical data about the user, from the data gathered from the user in an interview flow, and/or from data entered by the user. The list of one or more completion candidates may be determined based on some or all of these one or more characteristics and also on one or more other users having identical or similar characteristics.

The list of completion candidates may be presented to the user for selection or confirmation in some embodiments. Upon receiving the user's selection or confirmation, the field in the electronic document may be populated with the completion candidate. In some other embodiments, a completion candidate may be automatically populated into one or more appropriate fields of the electronic document based in part or in whole on one or more criteria. For example, if the confidence level of a single completion candidate exceeds a threshold level, the completion candidate may be automatically populated.

In some embodiments, some techniques described herein configure and build various generic modules that are used to automatically fill or complete electronic documents for a plurality of application software or software services. These generic modules are generic in that they interact with the plurality of application software or software services to automatically fill or complete various different types of electronic documents, even when the electronic documents have never been identified or processed by these generic modules.

In some embodiments, when a user interacts with application software or a software service to generate an electronic document, the electronic document may include one or more fields to be completed or filled. Some techniques described herein identify one or more computer files (e.g., scanned or photographed images, files with embedded fonts, etc.) such as scanned receipts, the scanned or photographed W2 form, various scanned or photographed 1099 forms, etc. These documents may be processed by various modules including, for example, data mining modules, data analysis modules, and/or language processing modules, etc. to extract or identify data from these one or more computer files based in part or in whole upon what information or data is needed to generate a fully or partially filled electronic document. The extracted or identified data may then be used to automatically fill or complete the electronic document without human intervention.

FIG. 1 illustrates a high level system diagram of a system that implements automatic fill or completion for application software and software services in some embodiments. More specifically, FIG. 1 illustrates a computing platform 100 including a user computing device 102 such as a personal computer, a laptop, a smart phone, a tablet, etc. The user computing device 102 is communicatively connected to one or more servers via the internet or intranet 180. The one or more servers provides a set of application software or software services (e.g., software as a service or SaaS) 162 that may further include, for example but not limited to, a tax return preparation application software or software service 164, an accounting application software or software service 166, a finance application software or software service 168, an enterprise application software 170, etc.

An application software or software service described herein includes a computer program that is configured or designed to perform specific tasks (e.g., word processing, accounting, financial management, tax return preparation, etc.) beyond the basic or general operations of computers in some embodiments. An application software or software service may be modularized or non-modularized and is distinguishable from operating systems, utilities, or software systems such as search engines. A utility is a program designed to perform a particular function for compute system management and is not an application software or software service. An operating system is system software that manages hardware and software resources of a computer and provides common services for computer programs and is not an application software or software service.

An application software or software service described herein performs incremental searches for completion candidates for automatic fill or completion by performing queries in standard query languages (e.g., SQL or structured query language), instead of Web search queries, or by looking up query results sets generated by previously performed queries in standard query languages, instead of Web search queries that search engines common perform to retrieve search engine results pages (SERPs). Moreover, a Web search query is a query that a user enters into a web search engine and often includes plain text or hypertext with optional search directives (such as "and", "or", etc. with "-" to exclude).

In contrast, standard queries in standard query languages are governed by strict syntax rules as domain-specific interpreted languages with keyword or positional parameters. A standard query language such as SQL includes, for example, data definition language, data manipulation language, and data control language each of which is governed by strict syntax rules. Queries in standard query languages are thus distinguishable from Web search queries that usually contain hypertext or one or more words, phrases, or sentences in a natural language. In addition to using different queries, an application software or software service described herein is further distinguishable from search engines in that search engines generate search engine results pages (SERPs) that are presented to users in browsers. On the other hand, an application software or software service described herein generates various forms and electronic documents in various structured or unstructured formats in a persistent storage, instead of or in addition to search engine results pages presented in a Web browser.

The set of application software or software services (e.g., software as a service or SaaS) 162 may be entirely installed on a user computing device 102 or may be entirely hosted on the one or more servers while the user computing device 102 utilizes a thin-client architecture to access the set of application software or software services 162. In some embodiments, the set of application software or software services 162 is distributed among both the user computing device 102 and the one or more servers to achieve a balance between the cost of round trips to these one or more servers, utilization of server computational resource and user computing device 102, and efficiency as well as effectiveness of the performance of the set of application software or software services 162.

In some embodiments, the set of application software or software services 162 interacts with a set 128 of various data structures, documents, libraries, etc. The set 128 of various data structures, documents, libraries, etc. may include, for example, one or more lexicons 172, one or more libraries 173, one or more models 174, one or more templates 175, one or more lists, tables, databases, or any appropriate forms of data structures 176, and a plurality of user profiles, user characteristics, etc. 177. A lexicon may include, for example, a set of permissible or prohibited characters, symbols, words, phrases, and/or sentences. Different documents, forms, or even fields may correspond to different lexicons; and a set of lexicons may be stored as the one or more lexicons 172 so that particular application software or software services may reference a specific lexicon for automatic fill or completion of one or more fields, documents, or forms.

The one or more libraries 173 may include one or more sets of characters, symbols, words, phrases, or sentences that may be referenced or searched against for recognition of contents of computer files for the purpose of automatic fill or completion of one or more fields, documents, or forms. The one or more models 174 may include one or more data models from data mining modules (e.g., 102) and/or one or more predictor modules from the data analysis modules (e.g., 104). The one or more templates may include one or more input templates (e.g., an input template for W2 forms, an input template for 1099-INT forms, an input template for 1099-DIV forms, etc.) and/or one or more output templates (e.g., an output template for form 1040, an output template for form 540, etc.)

The set of application software or software services 162 and the set 128 of various data structures, documents, libraries, etc. may interact with, via one or more network components 190 (e.g., the Internet, an intranet, a cellular network, etc.), one or more servers 150 in a parallel computing paradigm or a distributed computing paradigm 100 to invoke and interact with one or more modules therein or the results generated by the one or more modules. These one or more modules that may be invoked by the one or more servers 150 to perform various functions described herein are collectively referred to as one or more automatic fill or completion modules. The one or more servers 150 in a parallel computing paradigm or a distributed computing paradigm may include one or more data mining modules 102 to generate one or more data models (e.g., 216A) for historical data and/or real-time data.

The one or more servers 150 in a parallel computing paradigm or a distributed computing paradigm may include 100 may include one or more data analysis modules 104 to analyze mined data to generate one or more predictor models based on the one or more data models from the one or more data mining modules 102. The one or more servers 150 in a parallel computing paradigm or a distributed computing paradigm may include 100 may include one or more language processing modules 106 to process and recognize contents of various files, documents, etc. and the meanings thereof.

The one or more servers 150 in a parallel computing paradigm or a distributed computing paradigm may include 100 may include one or more data collection modules 108 to gather or collect historical data and/or real-time data that may be further fed to, for example, the one or more data mining modules 102, the one or more data analysis modules 104, and/or the language processing modules 106 for further processing, recognition, and analyses.

The one or more servers 150 in a parallel computing paradigm or a distributed computing paradigm may include 100 may include one or more data aggregation modules 110 to aggregate various pieces of data and to arrange and store these various pieces of data in a structured manner (e.g., in a relational database). The one or more servers 150 in a parallel computing paradigm or a distributed computing paradigm may optionally include 100 may include one or more interview modules 111 to initiate an interview flow for a user, to collect user's responses, and to formulate subsequent interview questions based in part or in whole upon received user's responses. Although the one or more interview modules 111 are optional, the information or data collected through an interview flow may be further used to, for example, reduce the search space for completion candidates, enhance suggestions for completion candidates, reduce runtime in determining completion candidates, etc.

The one or more servers 150 in a parallel computing paradigm or a distributed computing paradigm may include 100 may include one or more communication modules 112 to provide information to and to gather information from users. The one or more communication modules 112 may also be used to invoke and handle inter-process, inter-module, or inter-computer communications. The one or more servers 150 in a parallel computing paradigm or a distributed computing paradigm may include 100 may include one or more incremental search modules 114 to perform one or more searches, look-ups, and/or queries to determine a list of one or more completion candidates for automatic fill or completion of one or more fields, forms, and/or documents.

The one or more incremental search modules 114 may also function in tandem with the one or more data analysis modules 104 to determine the order, priority, ranking, or confidence levels of completion candidates in some embodiments. The one or more servers 150 in a parallel computing paradigm or a distributed computing paradigm may include 100 may include one or more output modules 116 to generate and format a completion candidate, a form, a document, etc. and to store the completion candidate, the form, the document, etc. in a persistent storage. More details about some of the modules in the one or more servers 150 in a parallel computing paradigm or a distributed computing paradigm will be described in the subsequent paragraphs with reference to FIGS. 2A-D.

Figure 2A:
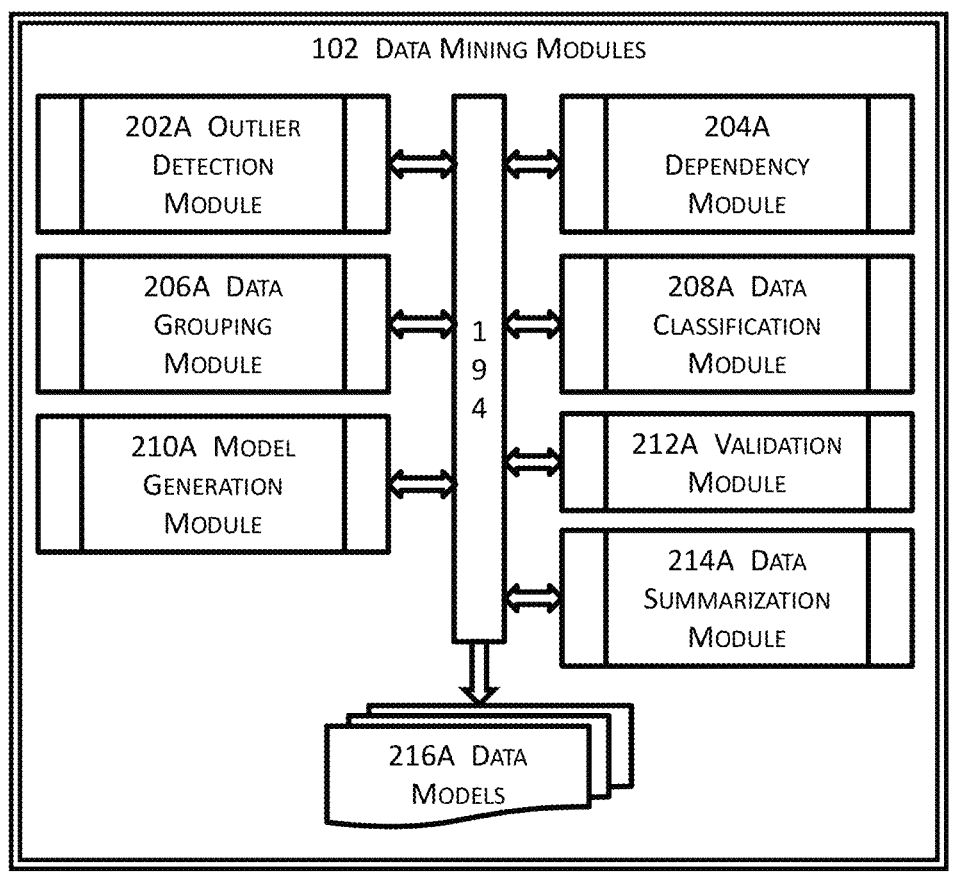
FIG. 2A illustrates an example of some sub-modules of data mining modules illustrated in FIG. 1 for automatic fill or completion for application software and software services in some embodiments.

FIG. 2A illustrates an example of some sub-modules of data mining modules illustrated in FIG. 1 for automatic fill or completion for application software and software services in some embodiments. The one or more data mining modules 102 are to extract information from input data and transform the extracted information into understandable structures, patterns, knowledge, etc., rather than the data itself in the input data, for future use by utilizing, for example, databases, various types of data preprocessing, models, etc. to manage the input data. In some of these embodiments, sampling techniques or statistical techniques may be used in various modules described herein so that these various modules need not process all the input data, which may include an enormous amount of data.

In some other embodiments, all the input big data may be processed to establish one or more relations or models to represent the interactions between various elements in the input big data without sampling. In these embodiments, the sheer amount of data and extracted structures, knowledge, and/or patterns may prefer direct-attached storage with a plurality of solid-state drives (SSDs) having the capacity of several or even tens of petabytes (PB) in parallel processing computing nodes over conventional, high-capacity hard disks in a storage area network (SAN) or network attached storage (NAS). The input data may come from different sources such as text, scanned or photographed images, audio files or streams, video files or streams, etc. and may be recognized, extracted, and aggregated through data aggregation or fusion (e.g., by using the one or more data aggregation modules 110).

The one or more data mining modules 102 may process historical data and/or real-time data that are native to the application software and software services (e.g., application software or software services for tax return preparation, financial management, accounting, enterprise applications, etc.) in some embodiments. In these embodiments, the application software and software services may natively access the input data and manipulate the input data to obtain desired or required understandable structures or knowledge.

For example, application software or software services may process previously generated tax returns with the one or more data mining modules to establish understandable structures, patterns, relations, and/or knowledge to generate a plurality of data models 216A that may be further used in, for example, the one or more data analysis modules 104 that generates a plurality of predictor models that may be used to predict or suggest completion candidates for fields, forms, or documents for a user based in part or in whole upon one or characteristics of the user.

In some other embodiments, the application software and software services may function with one or more other modules (e.g., one or more language processing modules 106, one or more data collection modules 108, one or more data collection modules, one or more communication modules 112, etc.) to process external historical and/or real-time data that are, in and of itself, not accessible by the application software and software services. An example of such external data includes data generated by a third party in a proprietary or non-exchangeable format. In these embodiments, the one or more data mining modules may function in tandem with one or more other modules and/or translators to access such external data.

The one or more data mining module may further use various techniques such as database techniques (e.g., indexing techniques, query techniques, versioning techniques, undo and/or redo logging techniques, etc.), statistical techniques, etc. to process the input data to extract the understandable structures, knowledge, patterns, etc. and to generate one or more data models 216A representing the input data so that these one or more data models 216A may be further used in one or more other modules such as the one or more data analysis modules 104, the one or more language processing modules 106, etc.

In these embodiments, the data mining modules 102 may include an outlier detection module 202A to detect and filter out outliers including, for example, noise, typographical errors, irrelevant data, etc. from the input data. In some of these embodiments, the outlier detection module 202A may further detect and filter out specific data such as personal information, sensitive information, negative information (e.g., information having discriminatory or prejudicial effects), or any classes of information that may lead to any undesired effects.

The one or more data mining modules 102 may also include one or more dependency modules 204A that determine dependencies between various elements in the input data and one or more data grouping modules 206A that classify at least a portion of input data into groups. The one or more data mining modules 102 may also include one or more data classification modules 208A that classify at least some of input data into classifications and one or more model generation modules 210A that generate one or more data models, one or more patterns, one or more understandable structures, one or more relations between some data elements (e.g., between one or more independent variables and one or more dependent variables in a model when statistical techniques are used).

For example, the one or more model generation modules 210B may generate a data model that describes the probabilistic distribution of specific itemized deductions of users with respect to, for example, their age, residential areas, etc. The one or more data mining modules 102 may also include one or more validation modules 212A to validate the structures, relations, patterns, knowledge, etc. generated by the one or more model generation module 210A. For example, the one or more model generation module 210A may generate a data model by using one or more training datasets; and the one or more validation modules 212A may use a test dataset that has not been observed or processed as a part of the one or more training datasets to determine whether the generated data model statistically represents the input data. The one or more data mining modules 102 may also include a data summarization module 214A that arrange, format, and present a graphical and/or textual summary for the processed input data.

Figure 2B:
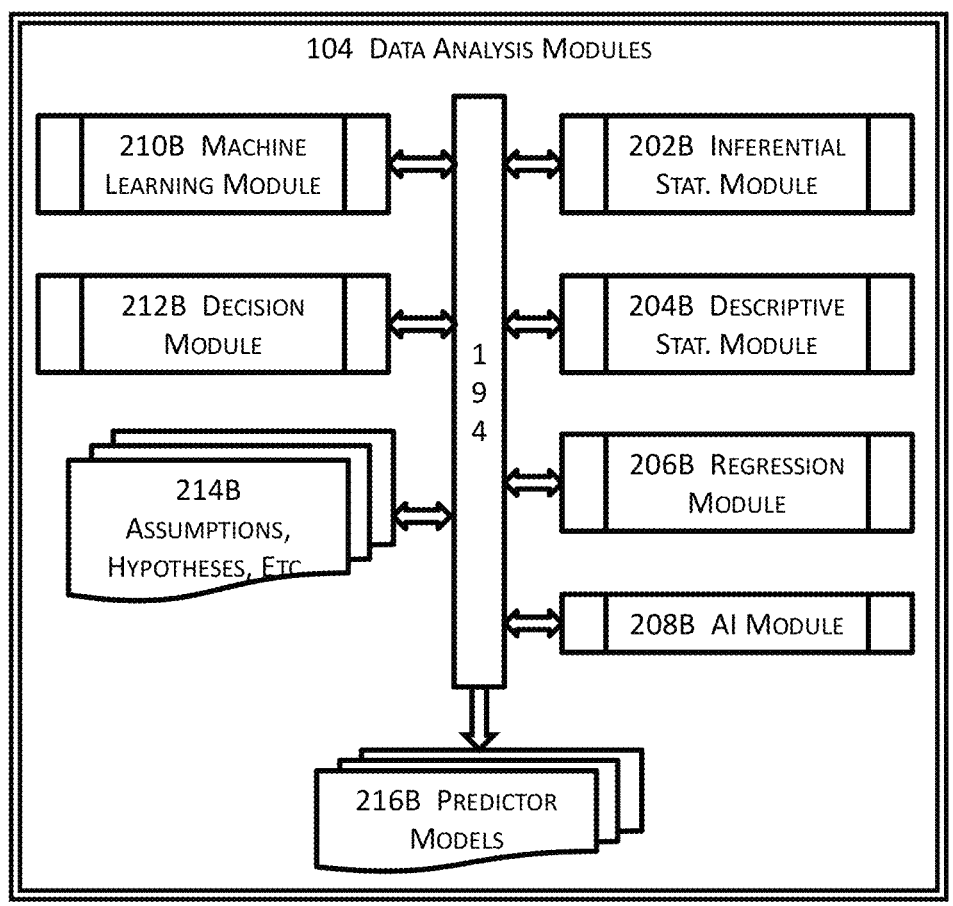
FIG. 2B illustrates an example of some sub-modules of data analysis modules illustrated in FIG. 1 for automatic fill or completion for application software and software services in some embodiments.

FIG. 2B illustrates an example of some sub-modules of data analysis modules illustrated in FIG. 1 for automatic fill or completion for application software and software services in some embodiments. In these embodiments, the one or more data analysis modules 104 perform various analyses on input data or the extracted structures, patterns, relations, knowledge, etc. from the one or more data mining modules 102 to generate one or more predictor modules 216B.

A predictor module 216B predicts or suggests one or more characters, words, phrases, or sentences based in part or in whole upon one or more characteristics of a user with or without user's input in a particular field to be automatically filled or completed although the user's input may be used to shrink the search space for completion candidates and may enhance the correctness of the completion candidate(s). For example, a user of a tax return preparation application software or software service resides in San Diego, Calif. and has an IEEE (Institute of Electrical and Electronic Engineers) membership.

For the field that expects the information for the employer of the user, a predictor module establishing a probabilistic distribution for employers of users with respect to residential areas and occupations may automatically fill or suggest "Qualcomm, Inc." for the employer field even when the user has not entered any information into the field. In this example, if the user enters the letter "i" in the employer field, the predictor module may then suggests one or more highest ranked (e.g., with the highest probability, highest order, highest priorities, etc.) completion candidates whose names start with the letter "i" and present these one or more completion candidates to the user.

In some of these embodiments, if the predictor model 216B determines that with the one or more characteristics of the user and the user's input of letter "i", the completion candidate "Intuit, Inc." is determined to have a confidence level exceeding a predetermined threshold, the predictor module 216B may function in tandem with one or more other modules to automatically fill the field with "Intuit, Inc." without presenting a list of one or more completion candidates to the user and awaiting the user's selection or confirmation.

The one or more data analysis modules 104 may include an inferential statistical module 202B that includes a set of model assumptions about the data generation process of the observed input data and performs one or more inferential statistical analyses. This set of assumptions describes a set of probability distributions, at least some of which are assumed to approximate the distributions. The correctness of the assumptions may affect the correctness of the statistical conclusion about the input data. The set of assumptions may include one or more distributional assumptions where a statistical model involves terms relating to random errors, and distributional assumptions may be made about the probability distribution of these random errors.

The set of assumptions may also include one or more structural assumptions where a statistical relationship between variables is modelled by expressing one variable as a function of another variable(s) plus a random error. The set of assumptions may also include one or more cross-variation assumptions that involve joint probability distributions of either the input data or the random errors in a model. The set of assumptions may include design-based assumptions that relate to the way observations have been gathered for the input data.

The one or more data analysis modules 104 may include a descriptive statistical module 204B that performs one or more descriptive statistical analyses. Both the inferential statistical module 202B and the descriptive statistical module 204B may deduce one or more properties of an underlying relationship or pattern in the input data by analyzing the input data. The differences between an inferential statistical model 202B and a descriptive statistical model 204B are that an inferential statistical model 202B infers one or more properties, tests one or more hypotheses, and derives one or more estimates about a population, and that the population is assumed to be larger than the actual input data that is being processed. A descriptive statistical model 204B is only concerned with properties of the actual input data and does not assume that the actual input data came from a larger population.

The one or more data analysis modules 104 may include one or more regression modules 206B that perform one or more regression analyses that establish one or more models (e.g., a mathematical model) to represent the interactions between various elements or variables in the input data. These one or more regression models may include a linear regression model analyzing the relation between a dependent variable and one or more independent variables. The one or more regression models may also include a multivariate regression model, a logistic regression model, a multinomial logistic regression model, a probit regression model, a logit versus probit regression model, a time series model, a survival or duration analysis model, a classification and regression tree model, a multivariate adaptive regression spline model, or any combinations thereof.

The one or more data analysis modules 104 may include one or more artificial intelligence (AI) modules 206B to perform various AI functions including, for example, artificial intelligence training. Artificial intelligence training on an artificial intelligence module or an artificial neural network may be performed to find, fine tune, adjust, or modify one or more relationships, patterns, or correlations between, for example, the available information or data and the various modules described herein or between the determined understanding or description of input data and actual content of the input data. Once the training of the artificial intelligence process or module is complete, the method or the system may then utilize the artificial intelligence module for the understanding, description, or analysis of the various pieces of information extracted from the input data by, for example, the one or more data mining modules 102.

The one or more data analysis modules 104 may include a machine learning module 210B that further enhances various pieces of information or data (e.g., various structures, relations, patterns, knowledge, etc. extracted by the one or more data mining modules 102) by performing assisted or unassisted machine learning or training for these various pieces of information or data. The machine learning module 210B may also improves the accuracy of various data analysis modules (e.g., the inferential statistical module 202B, the descriptive statistical module 204B, the regression module 206B, the artificial intelligence module 208B, the one or more data mining modules 102, the one or more data collection modules 108, the one or more language processing modules 106, the predictor models 216B, etc.) to improve their efficiencies and/or accuracy.

For example, various modules described herein may forward the processing results to a human expert for review and validation of the processing results, meanings, or issues, etc. in order to generate validation results in some embodiments. In some other embodiments, the results of various modules described herein may be forwarded to the machine learning module 210B that may further perform a test, run a test data set, or perform a hypothesis test with known results to generate the validation results. The validation results may be transmitted back to the machine learning module or other modules (e.g., the language processing modules) to calibrate or adjust the parameters, algorithms, assumptions, etc. of these modules to improve their accuracy and/or efficiencies such that such modules may be used in a completely automatic manner once the confidence level or the accuracy level has been confirmed to reach a certain level.

The one or more data analysis modules 104 may include a decision module 212B that includes decision logic to describe a relation between elements of a decision. For example, a decision module 212B may invoke the decision logic therein to describe a relation between known data, the results of various models, the decision itself and use the relation to predict or forecast results. The decision model 212B may also function in tandem with one or more other modules (e.g., the inferential statistical modules 202B, the descriptive statistical modules 204B, the regression modules 206B, etc. to perform one or more statistical hypothesis tests with one or more assumptions (e.g., one or more assumptions described above) and one or more hypotheses 214B to generate one or more relations, models (e.g., one or more predictor models 216B), patterns, etc.

Figure 2C:
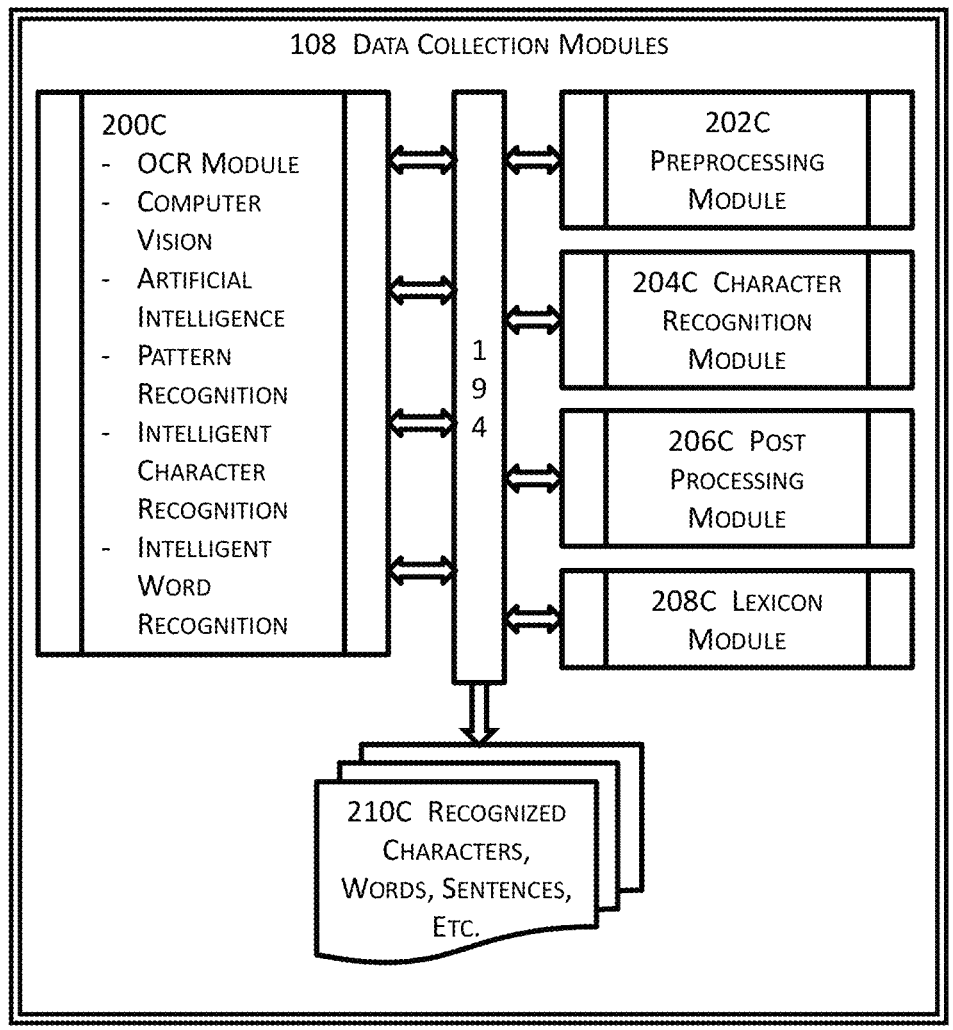
FIG. 2C illustrates an example of some sub-modules of data collection modules illustrated in FIG. 1 for automatic fill or completion for application software and software services in some embodiments.

FIG. 2C illustrates an example of some sub-modules of data collection modules illustrated in FIG. 1 for automatic fill or completion for application software and software services in some embodiments. The one or more data collection modules 108 may invoke one or more modules described below to generate recognized characters, symbols, words, phrases, sentences, etc. 210C from a computer file and may include a preprocessing module 202C to perform one or more preprocesses on input data. For example, a preprocessing module 202C may align a document properly, remove designated contents (e.g., certain personal information such as social security identifications, specific negative or positive information, etc.), clean up non-glyph boxes and lines, etc.

A preprocessing module 202C may also establish baseline for word and character shapes and separate words when needed. A preprocessing module 202C may also identify and recognize scripts in a file so that the corresponding optical character recognition module 202C may be invoked to handle the script in the file. A preprocessing module 202C may also perform character isolation or segmentation to separate multiple characters that are connected due to artifacts in, for example, a scanned image for the file. A preprocessing 202C may of course connect multiple disconnected characters or pieces into a connected word, phrase, or sentence. A preprocessing module 202C may also normalize the aspect ratio and/or scale of a file so that the text have uniform aspect ratio(s) and/or scale(s).

The one or more data collection modules 104 may include character recognition module 204C to recognize characters in a computer file by performing a pattern matching process that compares an image to a stored glyph on a pixel-by-pixel basis. A character recognition module 204C may further decomposes glyphs into features including, for example, lines, closed loops, line direct, line intersections, etc. The one or more data collection modules 104 may include a post processing module 206C that receives an OCR output generated by an OCR module 200C and improves the accuracy of the OCR output by further constraining the OCR output by a particular lexicon generated or maintained by the lexicon module 208C. For example, a post processing module 206C may further constrain an OCR output of a reduced-size image of a check with a lexicon including magnetic ink character recognition code (MICR code) to enhance the recognition of the bank code, the bank account number, etc. having smaller sizes due to the reduced size of the image to aid the classification or recognition of the image in a financial management or accounting application software or software service.

The one or more data collection modules 108 may include a lexicon module 208C that generates one or more lexicons. A lexicon includes one or more sets of permitted or prohibited symbols, characters, words, phrases, or sentences. As described above, various modules may access natively accessible, historical or real-time input data as well as non-native, historical or real-time input data (e.g., data in a proprietary format from a third party, images containing no recognizable text or information, etc.)

In some embodiments, the one or more data analysis modules 104 may include one or more content recognition modules 100C that may further include, for example, an optical character recognition (OCR) module, a computer vision module, an artificial intelligence module, a pattern recognition module, an intelligent character recognition module, an intelligent word recognition module, an intelligent phrase recognition module, an intelligent sentence recognition module, one or more translators between different formats of contents, or any combination thereof.

The one or more content recognition modules 100C may process non-native input data first via the OCR module or one or more translation modules to convert the non-recognizable contents into contents understood by computing device (e.g., the user computing device 102 or the one or more servers). The understandable contents may then be further processed by one or more modules described above to extract useful or pertinent information.

Figure 2D:
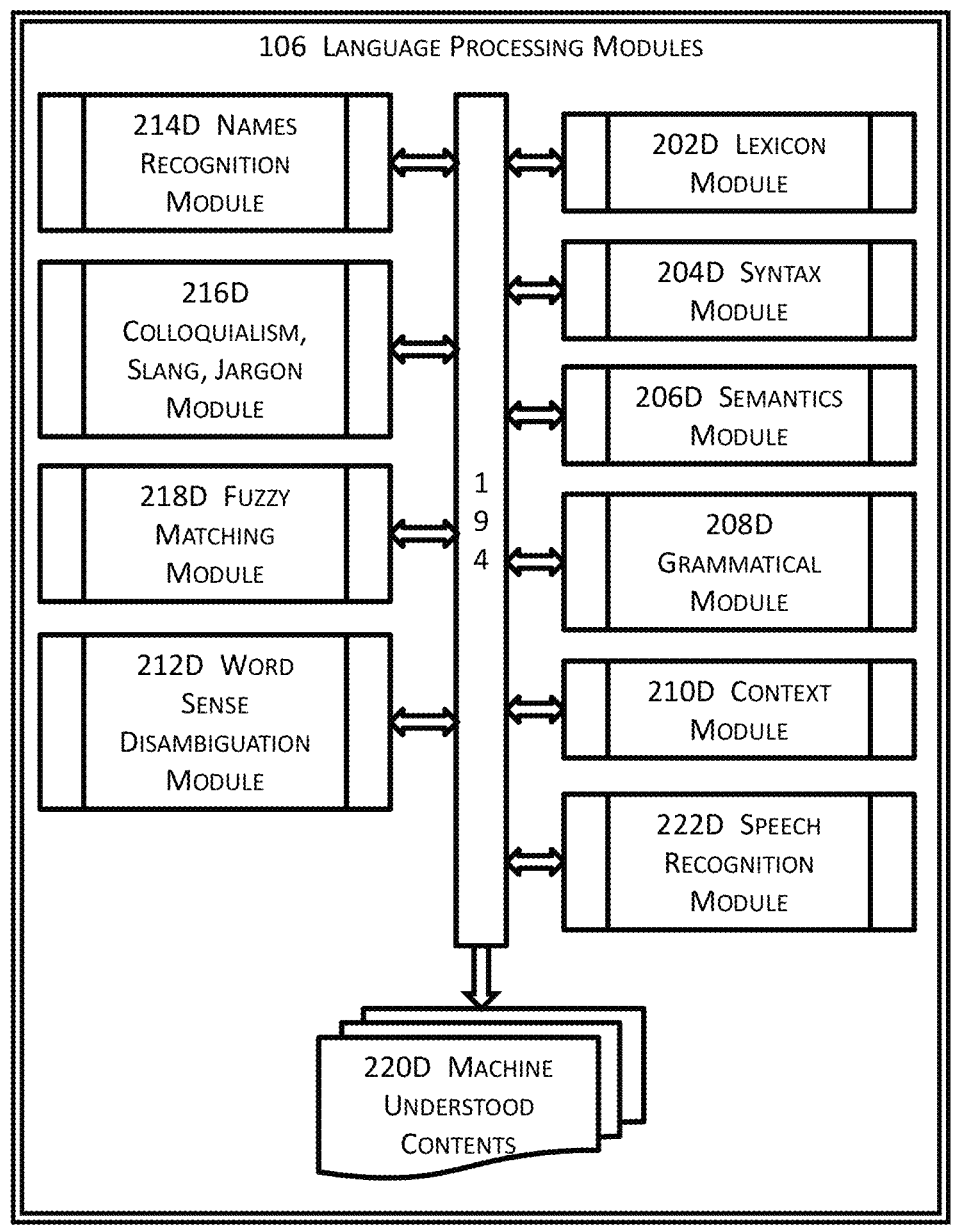
FIG. 2D illustrates an example of some sub-modules of language processing modules illustrated in FIG. 1 for automatic fill or completion for application software and software services in some embodiments.

FIG. 2D illustrates an example of some sub-modules of language processing modules illustrated in FIG. 1 for automatic fill or completion for application software and software services in some embodiments. The one or more language processing modules 106 may function alone or in tandem with one or more other modules (e.g., the data mining modules 102, the data analysis modules 104, the data collection modules 108, the data aggregation modules 110, the incremental search modules 114, the communication modules 112, and/or the output modules 116) to generate machine understood contents or machine understandable contents 220D.

In some of these embodiments, the one or more language processing modules 106 may include a lexicon module 202D, which may be shared between the one or more language processing modules 106 and one or more modules (e.g., the lexicon module 208C in the one or more data collection module 108), to generate one or more sets of permitted and/or prohibited characters, symbols, words, phrases, and/or sentences. The lexicon module 202D may also perform one or more lexical analyses via a lexing or scanning process to break up contents of input data into small tokens or units of a language of choice.

The one or more language processing modules 106 may also include a syntax module 204D that processes the results from the lexicon module 202D to identify the syntactic structure of the user generated content items so as to build a parsing result such as, but not limited to, a parse tree which represents the syntactic structure according to some grammar(s). The one or more language processing modules 106 may also include a semantics module 206D to perform one or more semantic analyses to determine or add semantic information to the result(s) of the syntax module 204D in some embodiments. The semantics module 206D may further perform static or dynamic semantic checks for type errors in some of these embodiments.

The one or more language processing modules 106 may also include a grammatical module 208D to analyze contents by using a set of grammatical construction rules. The one or more language processing modules 106 may also include a context module 210D that analyzes the context in which certain tokens or units are used so as to further ascertain or correct the results of various results of the lexicon module 202D, the syntax module 204D, the semantics module 206D. For example, the context module 210D may determine the meaning of a particular word or a particular symbol based on the preceding and/or the subsequent words, symbols, or expressions.

For example, an exclamation mark "!" has different meaning depending on the context in which the exclamation mark is used. In a literal construction, the exclamation mark may indicate a sharp or sudden utterance expressive of strong feeling of the user. On the other hand, the exclamation mark in a relational operator means "not equal to" when the exclamation mark is followed by "=". The one or more language processing modules 106 may also include a names recognition module 214D to recognize certain contents as names.

The one or more language processing modules 106 may also include a colloquialism, slang, and jargon module 216D to recognize jargons, colloquialisms, slangs in the input data. The one or more language processing modules 106 may also include a fuzzy matching module 218D to perform fuzzy matching between a search criterion (or criteria) or one or more phrases entered by a user to identify possible completion candidates to accommodate the scenarios where the user may have a, for example, typographical error. The one or more language processing modules 106 may also include a word sense disambiguation module 212D to select the appropriate meaning that makes the most sense for a word that has more than one meaning.

The one or more language processing modules 106 may also include a speech or audio recognition module 222D to process input data including an audio file or an audio stream and to recognize contents from the input data. The speech or audio recognition module 222D converts audio contents into machine understandable contents and enables the user to enter data in filling or completing a field, a form, or a document via speech or other modules to process the contents of audio contents.

Figure 3A:
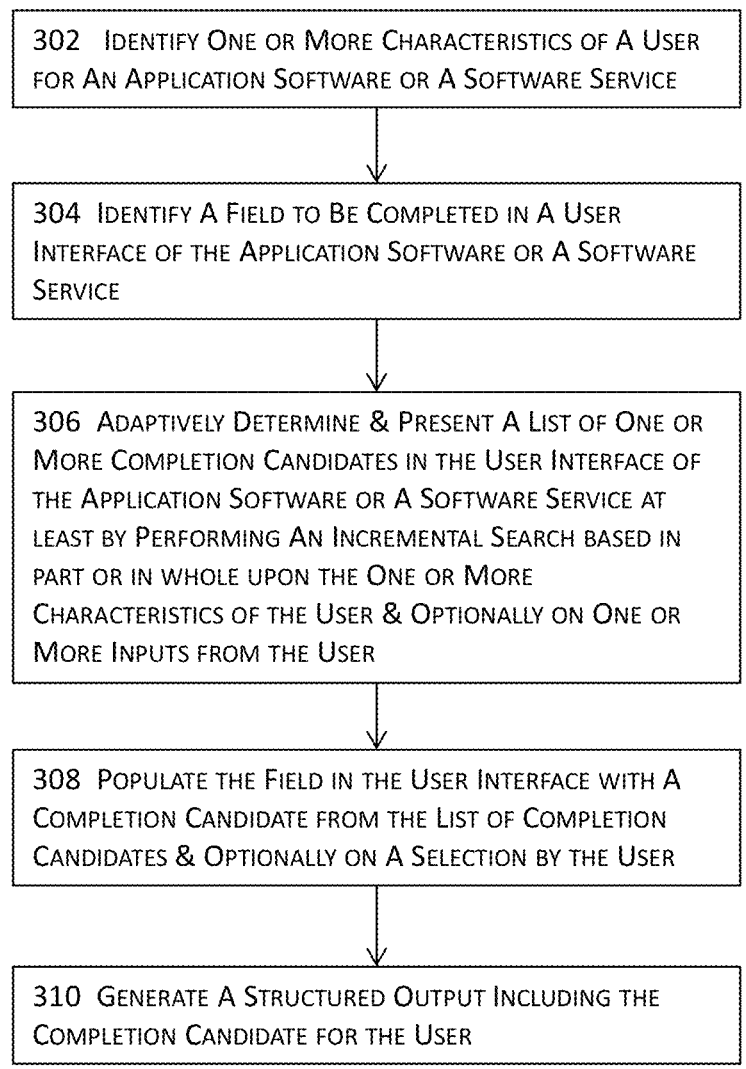
FIG. 3A illustrates a high level flow diagram for automatic fill or completion for application software and software services in some embodiments.

FIG. 3A illustrates a high level flow diagram for automatic fill or completion for application software and software services in some embodiments. In these embodiments, one or more characteristics of a user may be identified at 302 for an application software or software service. The one or more characteristics may include any characteristics that may cause dependency effects in or may have one or more relations among various elements of input data. For example, the users' ages, residence areas, employers, marital status, claimed deductions, donation histories, dependent status, the numbers of dependents, associated financial management or banking institutions (e.g., from various 1099 forms), taxable income levels or amounts, etc. may be used to establish one or more relations, patterns, or models among the input data. A field to be completed or filled in a user interface of the application software or software service may be identified at 304.

A list of one or more completion candidates may be adaptively determined at 306 by, for example, various modules described in FIGS. 2A-D for the field in the user interface of the application software or software service at least by performing one or more incremental searches based in part or in whole upon the one or more characteristics identified at 302. In some embodiments, the one or more characteristics of a user may be identified from a user profile that is constructed by user provided data (e.g., data collected from the user in an interview flow in the application software or software service).

In some of these embodiments, the list of one or more completion candidates may be presented to the user with or without user's input. For example, a list of completion candidates may be determined and presented to the user even when the user has not entered any input although any user's input may be further used to, for example, reduce search space for completion candidates, enhance suggestions for completion candidates, reduce runtime in determining completion candidates, etc. The list of one or more completion candidates may be adaptively or incrementally determined based in part or in whole upon the one or more characteristics identified specifically for the user at 302 and may be further based upon a plurality of users having one or more identical or similar characteristics.

In some embodiments, various modules and/or models used for the incremental or adaptive searches at 306 may be developed by processing the big data of all available historical data or real-time data from all users. In some other embodiments, various modules and/or models used for the incremental or adaptive searches at 306 may be developed by processing a sample (e.g., a random sample) of the big data of all available historical data or real-time data from all users. The field in the user interface may be populated at 308 with a completion candidate from the list of completion candidates.

In some embodiments, the field in the user interface may be populated at 308 with a completion candidate from the list of completion candidates optionally based on a selection by the user. In some embodiments, if the confidence level of a completion candidate exceeds a threshold level, the completion candidate may be automatically populated, even when the user does not select or confirm the selection of the completion candidate.

For example, a model may include a relation that describes 15% of users residing in Santa Clara, Calif. having a taxable income level between $100,000 and $149,000 are employed by Google Inc., 13% of the same are employed by Intuit, Inc., and 7% of the same are employed by Intel Corp. A user using the application software or software service may be identified to have the characteristics of having a taxable income level between $100,000 and $149,000 and residing in Santa Clara, Calif. If a field in the user interface of the application software or software service expects information about the employer of the user, a list of candidate employers including, for example, "Google Inc.", "Intuit, Inc.", and "Intel Corp.", etc. may be presented to the user even before the user enters any character into the field.

As the user enters the first character "i", the list of completion candidates may be adaptively updated to include "Intuit, Inc.", "Intel Corp.", and zero or more employers whose names start with the character "i". As the user further enters the second character "n", the list of completion candidates may be further adaptively updated to remove any completion candidates whose names do not start with "In". As the user enters the third character "t", the list of completion candidates may be further adaptively updated to remove any completion candidates whose names do not start with "Int". As the user enters the fourth character "e", the list of completion candidates may be further adaptively updated to remove any completion candidates whose names do not start with "Inte".

If the list of completion candidates is narrowed down to a completion candidate, or if a completion candidate corresponds to a confidence level exceeding a threshold confidence level, this completion candidate may be automatically populated into the designated field, with or without any intervention from the user. A structured output including the completion candidate may be generated at 310. For example, a form or document in a desired or required format and including the completion candidate in the designated field may be generated and stored in a persistent storage in some embodiments. The structured output may be generated by using an output template from a repository of output templates in a persistent storage.

This structured output is distinguishable with search engine outputs in that the completion candidate for a search engine is used as a keyword or keywords in a Web search query to identify a list of URLs (uniform resource links) and to present the list or URLs in search engine results pages (SERPs), whereas the list of one or more completion candidates may be generated by performing queries in standard query languages (e.g., SQL or structured query language), instead of Web search queries used by search engines, or by looking up query results sets generated by previously performed queries in standard query languages, instead of Web search queries that search engines common perform to retrieve search engine results pages (SERPs).

Figure 3B:
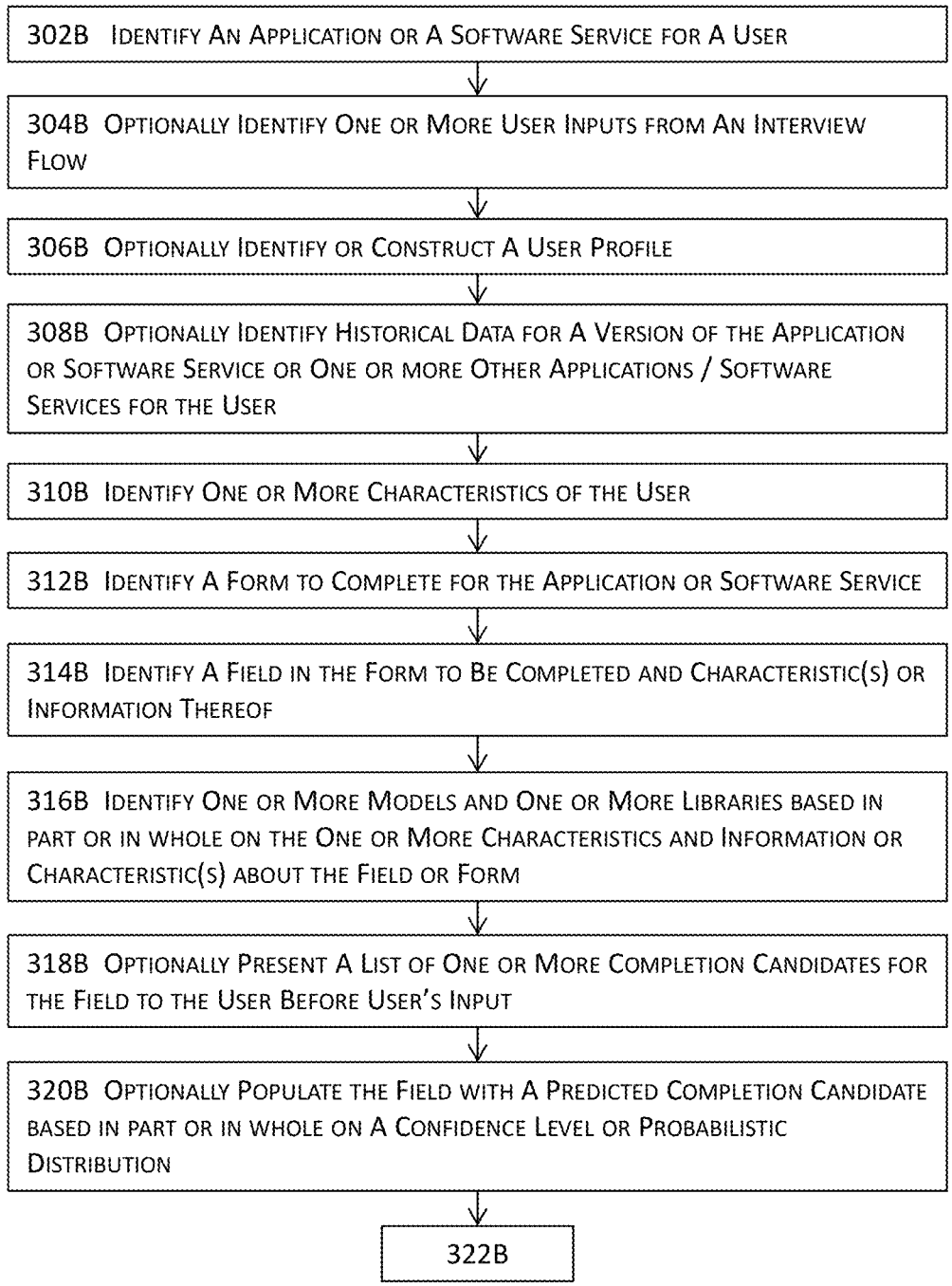
FIGS. 3B-C jointly illustrate a more detailed flow diagram for automatic fill or completion for application software and software services in some embodiments.
Figure 3C:
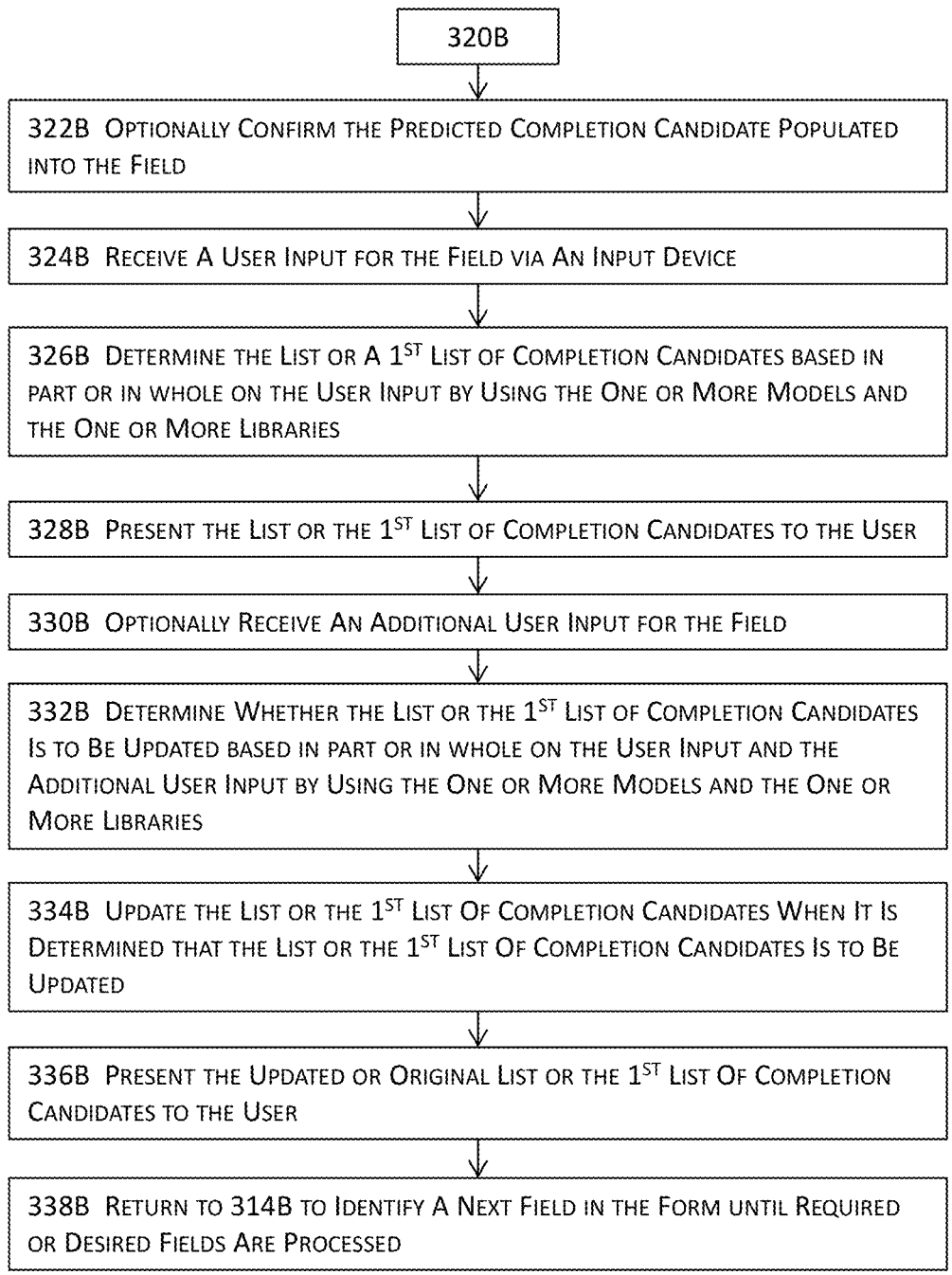

FIGS. 3B-C jointly illustrate a more detailed flow diagram for automatic fill or completion for application software and software services in some embodiments. In these embodiments, an application software or a software service may be identified at 302B for a user. One or more user inputs may be optionally identified at 304B from the user's response to one or more interview questions in an interview flow. The interview flow may adaptively determine the next question based on the user's response to one or more preceding questions in the interview flow in some embodiments.

In some embodiments, the one or more user's inputs may include, for example, whether these is a change in the user's status. For example, the interview flow may ask questions about whether the user changes the marital status, whether there is a change in the dependents of the user, whether the user would like to file the tax return for the current tax year jointly with the spouse or separately. A user profile may be optionally identified, if already existing for the user, or constructed, if non-existing, for the user at 306B. The user's profile may include the one or more characteristics identified at 310B in some embodiments.

Historical data for a version of the application software or software service or for one or more other application software or software services may be optionally identified at 308B for the user. For example, prior data for one or more prior versions of a tax return preparation application software or software services for one or more prior tax years may be identified at 308B. As another example, prior data for one or more application software or software services developed by one or more entities other than the entity developing the application software or software services may also be optionally identified at 308B. In some embodiments, real-time data or nearly real-time data (e.g., data collected for the current version of the application software or software services collected from the users shortly after the users entered it or from various modules described herein) may also be identified at 308B.

One or more characteristics may be identified at 310B for the user. For example, the users' ages, residence areas, employers, marital status, claimed deductions, donation histories, dependent status, the numbers of dependents, associated financial management or banking institutions (e.g., from various 1099 forms), taxable income levels or amounts, etc. may be identified at 310B. These one or more characteristics identified at 310B may be used as variables for one or more models (e.g., an inferential statistical model, a descriptive statistical model, one or more predictor models, etc.) to predict the values of one or more dependent variables to incrementally search for completion candidates in some embodiments.

At 312B, a form to be completed or filled for the application software or software service may be optionally identified in a user interface of the application software or software service. For example, the IRS (Internal Revenue Service) form 1040 or IRS form 540 may be identified at 312B. A field in or to be completed or filled for the form may be identified at 314B. It shall be noted that the form needs not necessarily be identified in its entirety or at all in some embodiments. Rather, various fields whose expected data or information, when identified, may be used to compose the corresponding form.

One or more models and one or more libraries may be identified at 316B based in part or in whole upon the one or more characteristics. In some of these embodiments, these one or more models and one or more libraries may be identified at 316B further based in part or in whole upon one or more characteristics and/or information about the field or form to be filled or completed. These one or more models may include one or more data models generated by one or more data mining modules, one or more predictor models generated by one or more data analysis modules, one or more statistical models generated by one or more statistical modules (e.g., an inferential statistical module, a descriptive statistical module, etc.), or any other relations, patterns, correlations, structures, and/or knowledge described herein or equivalents thereof.

The one or more libraries may include various static or dynamic libraries for the functioning of various modules described herein or one or more computing systems. The one or more libraries may further include one or more lexicons and various results sets of one or more previously performed relational database queries so that the determination of completion candidates may be accomplished by looking up the completion candidates from the previously established query result sets without performing database queries in some embodiments. The one or more libraries may further include various assumptions, various hypotheses, various hypotheses tests, various input and output templates for various forms or documents, or any other suitable information for various modules described herein to perform their intended functions.

A list of completion candidates may be optionally determined and presented at 318B in the user interface to the user before the user supplies any input to the field. The field may be optionally populated at 320B with a predicted completion candidate based in part or in whole upon the confidence level or probabilistic distribution for the predicted completion candidate. For example, if the confidence level of a completion candidate exceeds a threshold level, the completion candidate may be automatically populated, even when the user does not select or confirm the selection of the completion candidate.

The predicted completion candidate populated into the field identified at 314B may be optionally presented to the user for confirmation at 322B before the user provides any input at all in some embodiments. A user's input may be received at 324B for the field via an input device. For example, the user may start typing the user's input for the field with a computer keyboard or start speaking the user's input to a microphone operatively connected to the user's computing device at 324B. The list or a first list of completion candidates may be determined at 326B based in part or in whole upon the user's input by using the one or more models and one or more libraries.

In some embodiments, one or more incremental searches may be performed as the user continues to provide the user's input to adaptively or incrementally refine suggested or predicted completion candidates. The list or the first list of one or more completion candidates may be presented at 328B in a user interface to the user. At 330B, an additional user's input may be optionally received for the field. In the aforementioned example, the user may continue to enter the user's input with the computer keyboard or the microphone.

It may be determined at 332B whether the list or the first list of one or more completion candidates is to be updated based in part or in whole upon the user's input and the additional user's input at least by using the one or more models and the one or more libraries. It shall be noted that the additional user's input may or may not necessarily result in a change in the list or the first list of one or more completion candidates. In the aforementioned example where a user types the name of the employer, the list of completion candidates may include "Intuit, Inc." and "Intel Corp." until the user types the fourth character "u" that updates the list by removing "Intel Corp." from the list.

In addition, a change in a list of completion candidates does not necessarily result in one or more different completion candidates. In some embodiments, a list may be updated with a different order, ranking, or priorities of the same completion candidates. The list or the first list of one or more completion candidates may be updated at 334B when it is determined that the list or the first list is to be updated at 332B. When the list or the first list is updated, the updated list of one or more completion candidates for the field of interest may be presented at 336B in the user interface to the user. The process may then return to 338B to identify one or more next fields and repeat the processes for automatically filling or completing these one or more next fields.

Figure 4A:
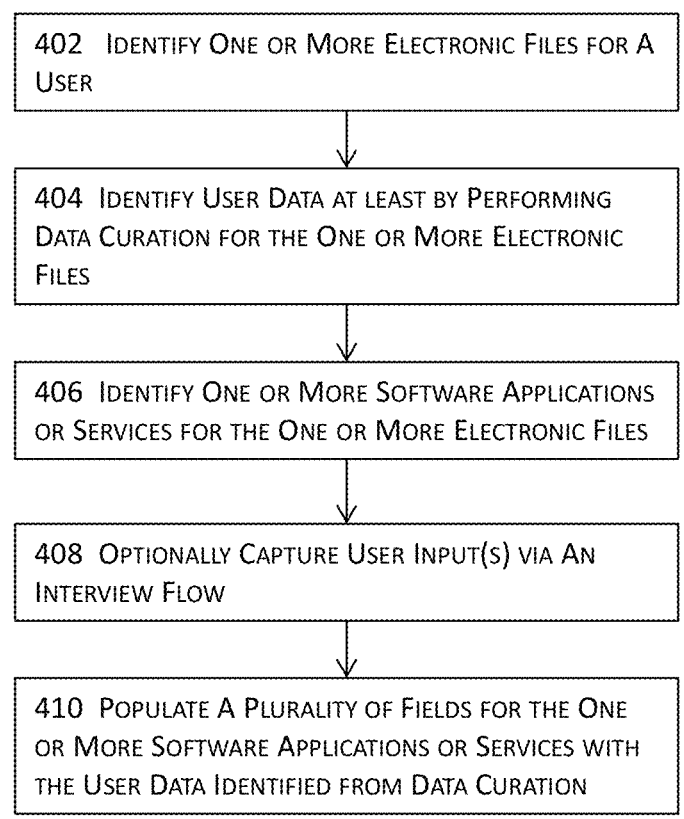
FIG. 4A illustrates another high level flow diagram for automatic fill or completion for application software and software services in some embodiments.

FIG. 4A illustrates another high level flow diagram for automatic fill or completion for application software and software services in some embodiments. More specifically, this high level flow diagram illustrated in FIG. 4A illustrates an automatic filling of one or more fields in a form or electronic document with minimal or no interactions between the flow and users. In these embodiments, one or more electronic files may be identified at 402 for a user. For example, the W2 form, various 1099 forms (e.g., 1099-INT for interest income, 1099-DIV for dividend income, etc.), one or more receipts of donations provided by charity organizations, one or more invoices or payment receipts for business expenses, etc. may be identified at 402.

These one or more electronic files may include recognizable contents or unrecognizable contents (e.g., scanned or photographed images). For example, a user may simply scan the paper copies of forms or receipts to create and store these one or more electronic files on a client computing device. User data may be identified at 404 at least by performing a data curation process for the one or more identified electronic files. A data curation may be performed by various modules described above with reference to FIGS. 1 and 2A-D and may generally include, for example, data creation or collection, data maintenance and management (e.g., grouping, classification, storage, etc.), data mining by, for example, one or more data mining modules, predictive analytics by, for example, one or more data analysis modules, language processing modules, etc.

The data curation process may also include a consistency checking process to determine whether there exist any inconsistencies in the extracted or recognized data from the one or more electronic files. In some embodiments, the consistency checking process may include comparing recognized contents to determine whether there exist any discrepancies in the recognized contents. For example, a consistency checking process may compare two names extracted from two separate electronic files and determine whether these two names are identical or different.

An inconsistency may be flagged for further review or confirmation by the user or may be automatically reconciled by one or more modules described herein. For example, a name "John A. Smith" recognized from a first electronic file and another name "John Adam Smith" recognized from a second electronic file may be automatically reconciled by one or more modules described herein or confirmed by the user. In some other embodiments, a consistency checking process may include validating at least a portion of the input data by running a test dataset that has not been used as a part of the training datasets to determine whether there exist any inconsistencies in the input data.

One or more application software or software services may be identified at 406B for the one or more electronic files. In the aforementioned example of identifying the W2 form, various 1099 forms, and various receipts, various techniques described herein may identify, without any user input, a tax return preparation application software or software service, an accounting application software or software service, and/or a financial management application software or software service based on the determined meanings (e.g., by one or more language processing modules) of the information or data in the one or more electronic files.

One or more user's inputs may be optionally captured or collected at 408 via an interview flow or a user interface. Although the process flow described with reference to FIG. 4A requires no user intervention or input, any user's input may be used to reduce the search space for completion candidates, enhance suggestions for completion candidates, reduce runtime in determining completion candidates, etc. Once these one or more application software or software services are identified at 406, one or more fields or one or more forms may be automatically populated at 410 with the user data identified at 404.

Figure 4B:
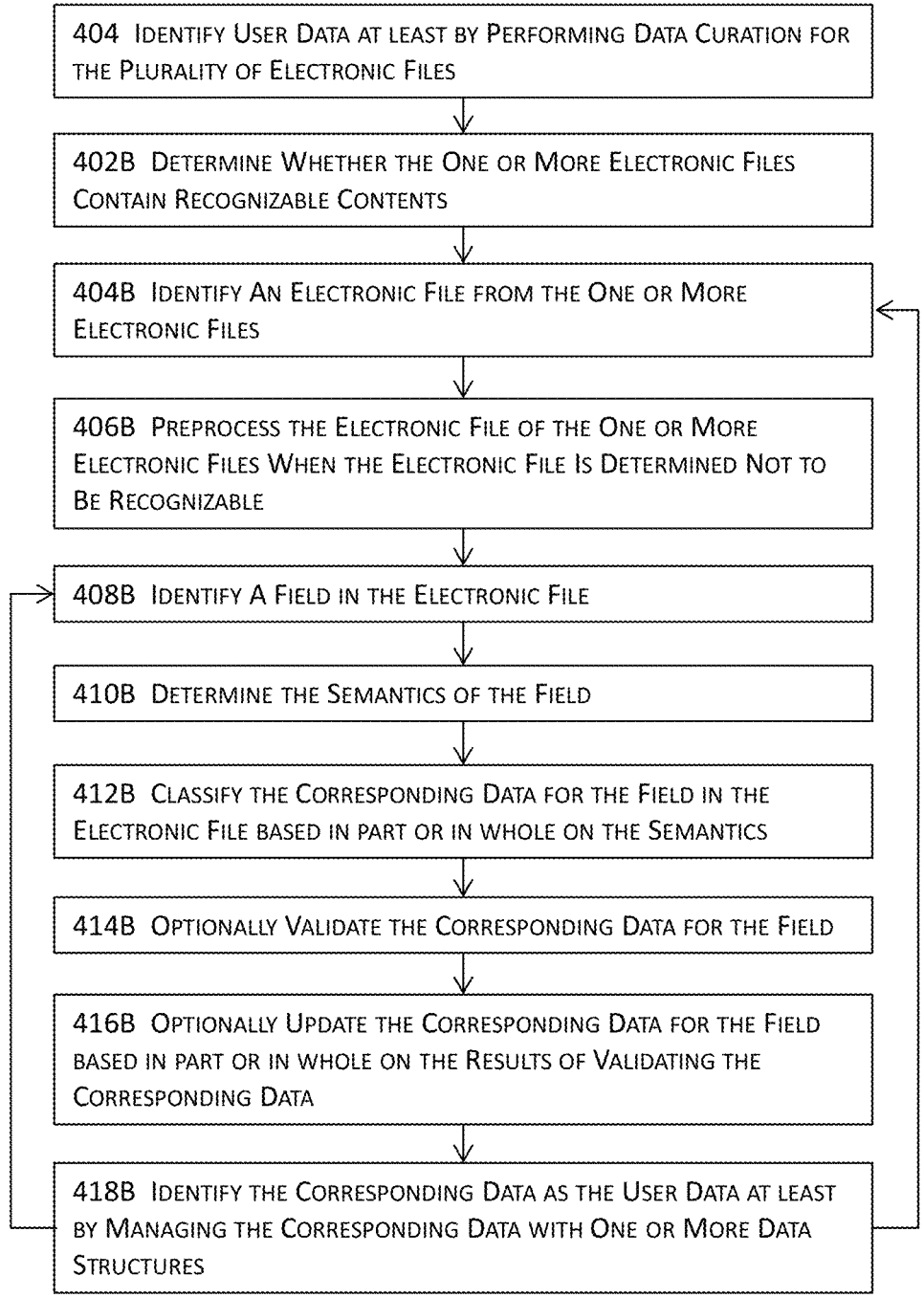
FIG. 4B illustrates a more detailed flow diagram for a portion of the high level flow diagram illustrated in FIG. 4A for automatic fill or completion for application software and software services in some embodiments.

FIG. 4B illustrates a more detailed flow diagram for a portion of the high level flow diagram illustrated in FIG. 4A for automatic fill or completion for application software and software services in some embodiments. More specifically, FIG. 4B illustrates more details about identifying user data at 404 in FIG. 4A. In these embodiments, the process may first determine, at 402B, whether the one or more electronic files contain recognizable contents understood by the application software or software services. An electronic file may then be identified at 404B from the one or more electronic files.

The identified electronic file may be preprocessed by, for example, the one or more data collection modules 108, at 406B when it is determined that the identified electronic file does not contain contents recognizable by the application software or software services. A field in the electronic file may be identified at 408B, and the semantics of the field may be determined at 410B by, for example, the one or more language processing modules 106. The corresponding data associated with the field may be classified at 412B for the field based in part or in whole upon the semantics determined at 412B.

For example, a field with recognized content of "FICA taxes" may be identified from a scanned W-2 form; the meaning of this field may be determined as "tax deductions"; and the amount associated with the field may be classified as "deductions from gross income" (or other appropriate classifications). The corresponding data may be optionally validated at 414B for the field. In the aforementioned example of FICA taxes, the amount corresponding to the "FICA taxes" may be validated by determining a confidence score or level and comparing the confidence score or level with a threshold score or level to ensure correctness of the amount.

The corresponding data for the field may be optionally updated at 416B for the field based in part or in whole upon the results of validating the corresponding data at 414B. The corresponding data may then be identified as a part of the user data at 418B at least by managing the corresponding data with one or more data structures stored in a persistent storage. The process may then return to 408B to identify the next field and repeat the process until all fields of interest have been similarly processed for the identified electronic file. The process may again be repeated for the remaining electronic files until all the one or more electronic files have been similarly processed to identify user data from these one or more electronic files.

Figure 4C:
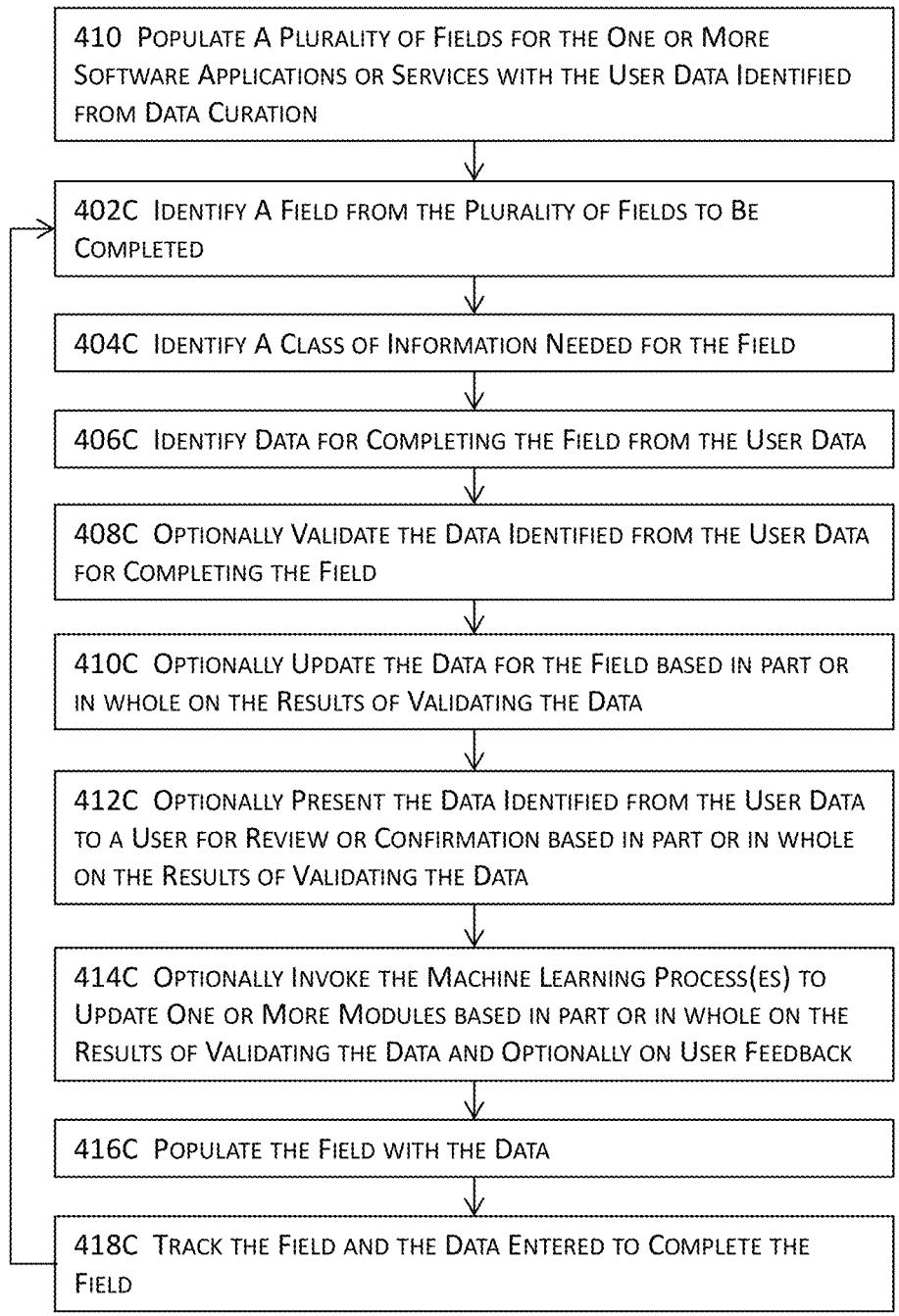
FIG. 4C illustrates a more detailed flow diagram for a portion of the high level flow diagram illustrated in FIG. 4A for automatic fill or completion for application software and software services in some embodiments.

FIG. 4C illustrates a more detailed flow diagram for a portion of the high level flow diagram illustrated in FIG. 4A for automatic fill or completion for application software and software services in some embodiments. More specifically, FIG. 4C illustrates an example of a process for populating a plurality of fields at 410 in FIG. 4A. In these embodiments, a field from the plurality of fields to be filled or completed may be identified at 402C. A class of information needed for the field may be identified at 404C. For example, the class of "name of a place" may be identified for a field expecting an address; the class of "name of a person" may be identified for a field expecting the name of a dependent; etc.

Data for completing the field may be identified at 406C from the user data identified at 404 based in part or in whole upon the class identified at 404C. The data identified from the user data at 406C may be optionally validated at 408C by, for example, determining a confidence level or score for the identified data. The identified data for automatically filling or completing the field may be optionally updated at 410C based in part or in whole upon the results of validating the data at 408C. The identified or updated data may be optionally presented at 412C in a user interface to a user for review or confirmation based in part or in whole upon the results of validating the data identified from the user data at 408C.

The machine learning modules, the artificial intelligence modules, or other modules may be optionally invoked at 414C to update one or more modules or models based in part or in whole upon the validating the data identified at 406C and optionally upon the users feedback from 412C. For example, machine learning modules, the artificial intelligence modules, or other modules may be optionally invoked at 414C to calibrate or adjust the parameters, algorithms, assumptions, etc. of one or more modules or models to improve their accuracy and/or efficiencies such that these one or more modules may be used in a completely automatic manner. The field may be populated with the data at 416C. In some embodiments, the process may track, at 418C, the field that has been automatically filled or completed to avoid unnecessary duplicative performances of some tasks for the same field.

Figure 5A:
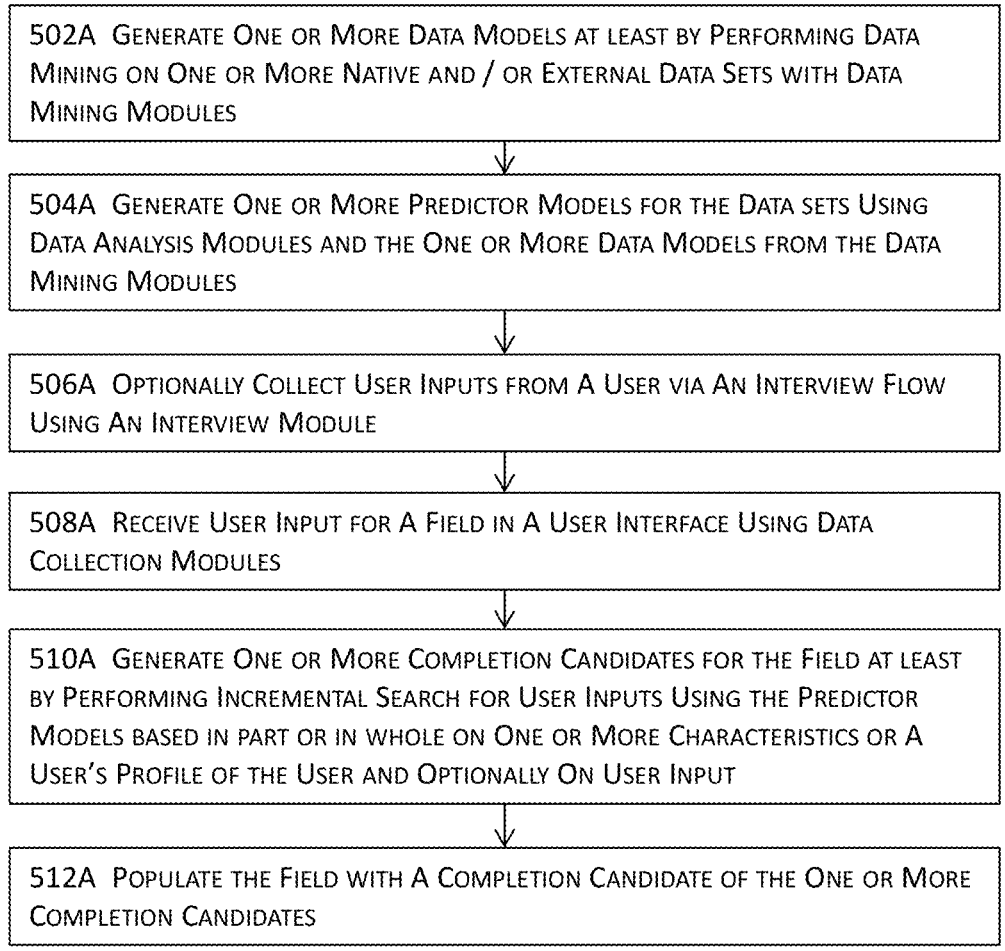
FIG. 5A illustrates another high level flow diagram for automatic fill or completion for application software and software services in some embodiments.

FIG. 5A illustrates another high level flow diagram for automatic fill or completion for application software and software services in some embodiments. More specifically, FIG. 5A illustrates the construction of generic modules that can be used to for any application software or software services for automatic fill or completion as described above. In these embodiments, one or more data models may be generated at 502A at least by performing data mining on one or more native and/or external, non-native data sets with one or more data mining modules. One or more predictor models may be generated at 504A for the one or more native and/or external, non-native data sets by using one or more data analysis modules and the one or more data models from the one or more data mining modules.

User inputs may be optionally collected at 506A from a user via an interview flow using an interview module as described above. One or more data collection modules may be devised or configured to receive user inputs for a field at 508A. One or more completion candidates may be generated or determined at 510A for the field at least by performing one or more incremental searches for the user input received at 508A by using the one or more predictor models based in part or in whole upon one or more characteristics or a user profile of the user. In some embodiments, these one or more completion candidates may also be generated optionally based in part or in whole upon the user's input. The filed may be populated at 512A with a completion candidate of the one or more completion candidates.

Figure 5B:
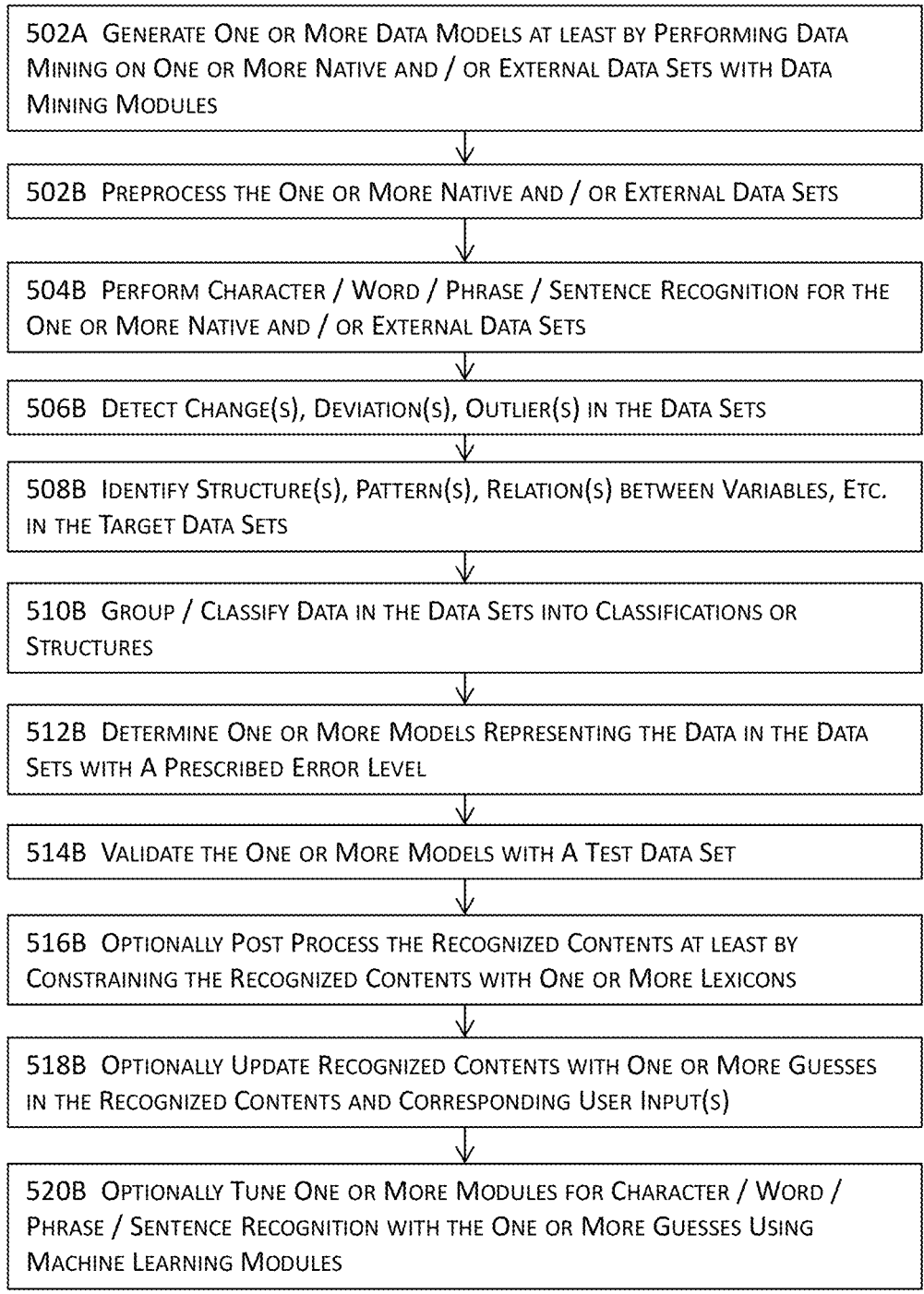
FIG. 5B illustrates a more detailed flow diagram for a portion of the high level flow diagram illustrated in FIG. 5A for automatic fill or completion for application software and software services in some embodiments.

FIG. 5B illustrates a more detailed flow diagram for a portion of the high level flow diagram illustrated in FIG. 5A for automatic fill or completion for application software and software services in some embodiments. More specifically, FIG. 5B illustrates more details about generating one or more data models at 502A in FIG. 5A. In these embodiments, the one or more native and/or external, non-native data sets may be preprocessed at 502B. Content recognition may be performed at 504B to recognize one or more characters, words, phrases, and/or sentences in the one or more native and/or external, non-native data sets.

One or more changes, outliers, deviations, etc. may be detected at 506B in the one or more native and/or external, non-native data sets by using, for example, the outlier detection module 202A. One or more structures, relations, patterns, or knowledge between elements in the one or more native and/or external, non-native data sets may be identified or extracted at 508A by using, for example, the one or more data mining modules 102. The data in the one or more native and/or external, non-native data sets may be grouped or classified into classifications or structures at 510B by using, for example, the one or more data mining modules 102.

One or more models with respective prescribed error levels may be determined and represent the data in the data sets at 512B; the one or more models may be validated at 514B with a test data set that does not belong to the one or more native and/or external, non-native data sets used in determining the one or more models. The recognized contents of the one or more native and/or external, non-native data sets may be optionally post processed at 516B at least by constraining the recognized contents with one or more lexicons.

In addition or in the alternative, the recognized contents may be optionally updated at 518B with one or more guesses in the recognized contents and one or more corresponding user input. One or more modules may be optionally tuned, enhanced, or corrected at 520B for recognition of characters, words, phrases, and/or sentences with the one or more guesses using one or more other modules such as the machine learning module, the artificial intelligence module, the one or more language processing modules, etc.

Figure 5C:
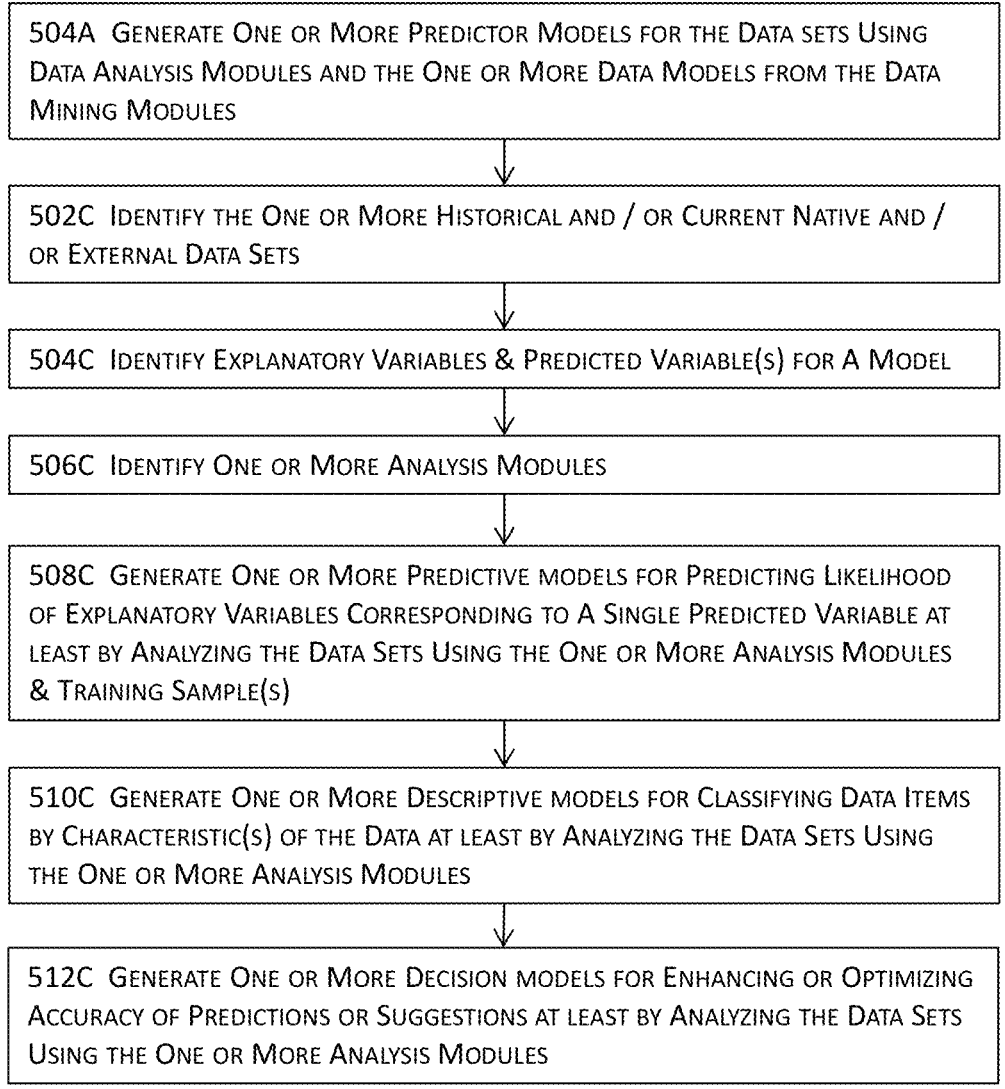
FIG. 5C illustrates a more detailed flow diagram for a portion of the high level flow diagram illustrated in FIG. 5A for automatic fill or completion for application software and software services in some embodiments.

FIG. 5C illustrates a more detailed flow diagram for a portion of the high level flow diagram illustrated in FIG. 5A for automatic fill or completion for application software and software services in some embodiments. More specifically, FIG. 5C illustrates more details about generating one or more predictor models at 504A in FIG. 5A. In these embodiments, one or more historical and/or real-time native and/or non-native data sets may be identified at 502C.

One or more independent variables (e.g., explanatory variables or predictors) and at least one dependent variable (e.g., a predicted variable or response) may be identified at 504C for a model. One or more analysis modules such as one or more regression analysis modules, a machine learning module, an artificial intelligence module, etc. may be identified at 506C. One or more predictive models or predictor models may be generated at 508C for predicting the likelihood of the one or more explanatory variables corresponding to a single predicted variable at least by analyzing the data sets using the one or more analysis modules and one or more training samples or data sets.

One or more descriptive models for classifying data items according to one or more characteristics of the data may be optionally generated at 510C at least by analyzing the data sets using the one or more analysis modules. For example, users may be classified by their itemized deductions claimed in their tax returns and their life stage. One or more decision models for enhancing or optimizing accuracy or efficiency of predictions or suggestions for completion candidates may also be optionally generated at 512C at least by analyzing the data sets using the one or more analysis modules. An example of a decision model may include "IF (male && age==26 && taxable income>=$140,000 && residence==Mountain View, Calif. THEN (first employer=="Google Inc."; second employer=="Intuit, Inc."; third employer=="Intel Corp."). The order of these completion candidates may be determined by, for example, a statistical or data model that processed historical and/or real-time data to determine the decision model listed above.

SYSTEM ARCHITECTURE OVERVIEW

Figure 6:
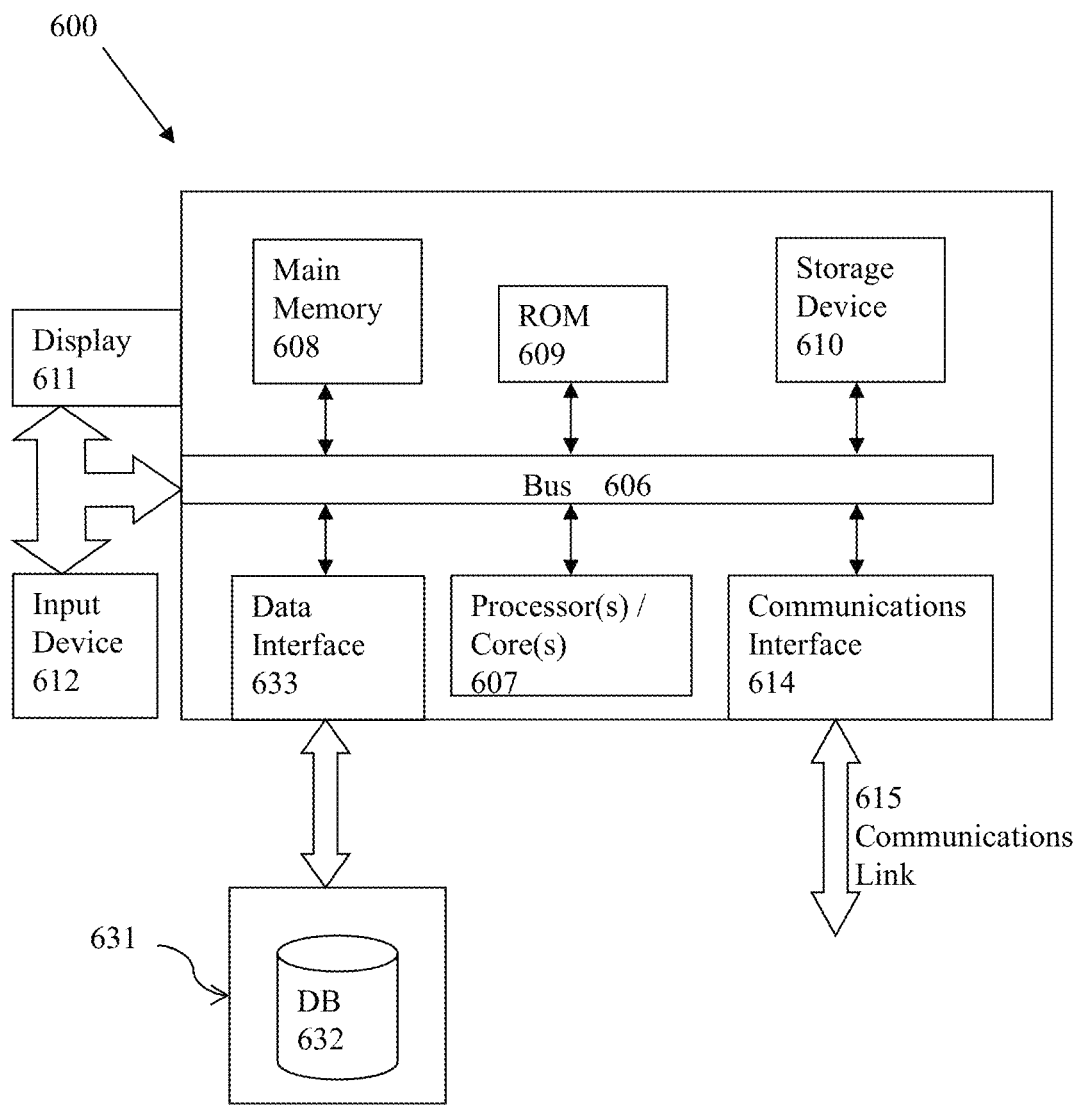
FIG. 6 illustrates a block diagram of an illustrative computing system suitable for implementing various embodiments described herein.

FIG. 6 illustrates a block diagram of an illustrative computing system 600 suitable for implementing various embodiments described in the preceding paragraphs with reference to various figures. Computing system 600 includes a bus 606 or other communication mechanism for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown).

According to one embodiment, computing system 600 performs specific operations by one or more processors or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads.

For example, the act of determining an abstraction scope, the act of identifying data included in or associated with a schematic symbol, the act of reproducing data included in or associated with a schematic symbol in a layout, the act of generating symbolic representations, the act of performing layout operations on symbolic representations, the act of traversing schematic symbols, the act of determining interconnections within a symbolic representation and/or interconnections between a symbolic representation and another symbolic representation, a layout circuit component, or a combination thereof, the act of generating bounding boxes for symbolic representations, the act of analyzing a layout, the act of partitioning a layout or a portion thereof, the act of generating topological routes or flight-lines, or any other acts that are described, required, or desired for various mechanisms or methods to achieve their intended purposes, etc. may be performed by one or more processors, one or more processor cores, or combination thereof.

A mechanisms described herein may also be implemented as a pure hardware module (e.g., a block of electronic circuit components, electrical circuitry, etc.) or a combination of a hardware module and a software block that jointly perform various tasks to achieve various functions or purposes described herein or equivalents thereof. For example, a mechanism described herein may be implemented as an application-specific integrated circuit (ASIC) in some embodiments.

In these embodiments, a mechanism may thus include, for example, a microprocessor or a processor core and other supportive electrical circuitry to perform specific functions which may be coded as software or hard coded as a part of an application-specific integrated circuit, ROM (read only memory), PROM (programmable read only memory), EPROM (erasable programmable read only memory), etc. despite the fact that these microprocessor, processor core, and electrical circuitry may nevertheless be shared among a plurality of mechanism. A mechanism described herein or an equivalent thereof may perform its respective functions alone or in conjunction with one or more other mechanisms. A mechanism described herein or an equivalent thereof may thus invoke one or more other mechanisms by, for example, issuing one or more commands or function calls. The invocation of one or more other mechanisms may be fully automated or may involve one or more user inputs.

The term "computer readable storage medium" or "computer usable storage medium" as used herein refers to any non-transitory medium that participates in providing instructions to processor(s) or processor core(s) 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computing system 600. According to other embodiments of the invention, two or more computing systems 600 coupled by communication link 615 (e.g., LAN, PTSN, or wireless network) may perform the sequence of instructions required to practice the invention in coordination with one another.

Computing system 600 may transmit and receive messages, data, and instructions, including program, i.e., application code, through communication link 615 and communication interface 614. Received program code may be executed by processor(s) or processor core(s) 607 as it is received, and/or stored in disk drive 610, or other non-volatile storage for later execution. In an embodiment, the computing system 600 operates in conjunction with a data storage system 631, e.g., a data storage system 631 that includes a database 632 that is readily accessible by the computing system 600. The computing system 600 communicates with the data storage system 631 through a data interface 633. A data interface 633, which is coupled with the bus 606, transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A machine implemented method for automatic fill or completion for application software or software service, the method being performed by at least a computing platform and comprising:
    identifying, at a computing platform including one or more servers that are communicatively connected via one or more network elements, one or more characteristics of a user accessing an application software or a software service via a user interface;
    identifying, at the computing platform, the application software or the software service including at least one field to be filled or completed with a first information, the first information including free-form content to be input into the at least one field;
    identifying, at a predictor model functioning on the computing platform in conjunction with at least one microprocessor, a plurality of users separate from the user based at least in part upon the one or more characteristics of the user;
    establishing, at the predictor model functioning on the computing platform, a probabilistic distribution predicting the free-form content of the first information for the user based at least in part upon one or more corresponding characteristics of the plurality of users;
    determining and presenting, at one or more automatic fill or completion modules that are stored at least partially in memory and function in tandem with one or more computer processors in the computing platform, a list of one or more completion candidates for the first information in the user interface of the application software or a software service based at least in part upon the probabilistic distribution and not based upon any user inputs of the first information; and
    populating the application software or the software service with a completion candidate from the list of one or more completion candidates.

2. The machine implemented method of claim 1, further comprising:
    identifying or generating a user profile for the user;
    identifying the one or more characteristics from the user profile; and
    identifying corresponding one or more characteristics from a plurality of other users for the application software or a software service.

3. The machine implemented method of claim 1, further comprising:
    the computing platform identifying one or more models and one or more libraries based in part or in whole upon the one or more characteristics of the user and information about the application software or the software service to be filled or completed; and
    the computing platform performing one or more incremental searches based in part or in whole upon the one or more characteristics of the user.

4. The machine implemented method of claim 3, further comprising:
    the computing platform identifying one or more data models that describe input data for filling or completing at least the application software or the software service with the first information; and
    the computing platform identifying one or more predictor models that suggest or predict at least some of the list of one or more completion candidates as the one or more models based in part or in whole upon the one or more data models.

5. The machine implemented method of claim 4, further comprising:
    the computing platform determining the list of one or more completion candidates by performing the one or more incremental searches with the one or more predictor models.

6. The machine implemented method of claim 4, further comprising:
    the computing platform identifying a user input that comprises at least one or more characters from the user via the user interface; and
    the computing platform determining the list of one or more completion candidates by performing the one or more incremental searches with the one or more predictor models based in part or in whole upon the user input.

7. The machine implemented method of claim 6, further comprising:
    the computing platform populating the application software or the software service with the completion candidate from the list of one or more completion candidates based in part or in whole upon one or more result sets of the one or more incremental searches by the one or more predictor models and further based in part or in whole upon the user input.

8. The machine implemented method of claim 1, further comprising:
    identifying, at the computing platform, a plurality of characteristics of a plurality of users of the application software or the software service;
    establishing, at the predictor model, the probabilistic distribution of the plurality of characteristics of the plurality of users;
    identifying, at the computing platform, a plurality of characteristics of a plurality of third parties for the application software or the software service based at least in part upon at least one characteristic pertaining to the one or more characteristics of the user;
    establishing, at the predictor model, one or more probabilistic distributions of the plurality of third parties; and
    determining, at the computing platform, one or more respective probability ranking levels for the one or more completing candidates in the list.

9. The machine implemented method of claim 8, further comprising:
    the computing platform identifying an additional user input that comprises at least one or more additional characters from the user via the user interface; and
    the one or more predictor models in the computing platform determining whether the list of one or more completion candidates is to be modified based in part or in whole upon the user input and the additional user input.

10. The machine implemented method of claim 9, further comprising:
    modifying the list of one or more completion candidates into a modified list of one or more completion candidates when it is determined that the list of one or more completion candidates is to be modified; and
    presenting the modified list of one or more completion candidates in the user interface to the user for automatically completing or filling the application software or the software service with the first information.

11. The machine implemented method of claim 1, further comprising:

the computing platform presenting the list of one or more completion candidates in the user interface to the user before the user provides any input for automatically completing or filling the application software or the software service with the first information;

the computing platform populating the application software or the software service with the completion candidate before the user provides any input including at least a portion of the first information; and the computing platform generating a structured output in an electronic document that does not include any search engine results pages.

12. The machine implemented method of claim 8, further comprising:

identifying, at the computing platform, a set of one or more assumptions that describes a set of probabilistic distributions, wherein the set of one or more assumptions includes one or more structural assumptions, one or more cross-variations, or one or more design-based assumptions.

13. The machine implemented method of claim 1, wherein the one or more characteristics of the user from which the plurality of users separate from the user are identified include at least historical data previously entered by the user.

14. A system for automatic fill or completion for application software or software service, comprising:

a computing platform that includes one or more servers that are communicatively connected via one or more network elements and that is configured at least to:

identify one or more characteristics of a user accessing an application software or a software service via a user interface;

identify the application software or the software service including at least one field to be filled or completed with a first information, the first information including free-form content to be input into the at least one field;

identify, at a predictor model functioning on the computing platform, a plurality of users separate from the user based at least in part upon the one or more characteristics of the user;

establish, at the predictor model functioning on the computing platform, a probabilistic distribution predicting the free-form content of the first information for the user based at least in part upon one or more corresponding characteristics of the plurality of users;

determine and present, at one or more automatic fill or completion modules of the computing platform, a list of one or more completion candidates for the first information in the user interface of the application software or a software service based at least in part upon the probabilistic distribution and not based upon any user inputs of the first information; and populate the application software or the software service with a completion candidate from the list of one or more completion candidates.

15. The system of claim 14, wherein the computing platform is further configured to:

identify one or more models and one or more libraries based in part or in whole upon the one or more characteristics of the user and information about the field to be filled or completed;

identify one or more data models that describe input data for filling or completing at least the field;

identify one or more predictor models that suggest or predict at least some of the list of one or more completion candidates as the one or more models based in part or in whole upon the one or more data models; and determine the list of one or more completion candidates by performing the one or more incremental searches with the one or more predictor models.

16. The system of claim 15, wherein the computing platform is further configured to:

identify a user input that comprise at least one or more characters from the user via the user interface;

determine the list of one or more completion candidates by performing the one or more incremental searches with the one or more predictor models based in part or in whole upon the user input; and populate the field with the completion candidate from the list of one or more completion candidates based in part or in whole upon one or more result sets of the one or more incremental searches by the one or more predictor models and further based in part or in whole upon the user input.

17. The system of claim 16, wherein the computing platform is further configured to:

identify an additional user input that comprise at least one or more additional characters from the user via the user interface; and determine whether the list of one or more completion candidates is to be modified based in part or in whole upon the user input and the additional user input.

18. The system of claim 14, wherein the one or more characteristics of the user from which the plurality of users separate from the user are identified include at least historical data previously entered by the user.

19. A computer program product comprising a non-transitory machine readable storage medium having stored thereupon a sequence of instructions which, when executed by a computing platform, causes the connected device to perform a set of acts for automatic fill or completion for application software or software service, the set of acts being performed by at least the computing platform and comprising:

identifying one or more characteristics of a user accessing an application software or a software service via a user interface;

identifying the application software or the software service including at least one field to be filled or completed with a first information, the first information including free-form content to be input into the at least one field;

identifying, at a predictor model functioning on the computing platform, a plurality of users separate from the user based at least in part upon the one or more characteristics of the user;

establishing, at the predictor model functioning on the computing platform, a probabilistic distribution predicting the free-form content of the first information for the user based at least in part upon one or more corresponding characteristics of the plurality of users;

determining and presenting, at one or more automatic fill or completion modules of the computing platform, a list of one or more completion candidates for the first information in the user interface of the application software or a software service based at least in part upon the probabilistic distribution and not based upon any user inputs of the first information; and populating the application software or the software service with a completion candidate from the list of one or more completion candidates.

20. The computer program product of claim 19, the set of acts further comprising:

presenting the list of one or more completion candidates in the user interface to the user before the user provides any input for the field; and populating the field with the completion candidate before the user provides any input for the field.

21. The computer program product of claim 19, the set of acts further comprising:

generating a structured output in an electronic document that does not include any search engine results pages.

22. The computer program product of claim 19, the set of acts further comprising:

identifying one or more models and one or more libraries based in part or in whole upon the one or more characteristics of the user and information about the field to be filled or completed;

identifying one or more data models that describe input data for filling or completing at least the field;

identifying one or more predictor models that suggest or predict at least some of the list of one or more completion candidates as the one or more models based in part or in whole upon the one or more data models;

determining the list of one or more completion candidates by performing the one or more incremental searches with the one or more predictor models;

identifying a user input that comprise at least one or more characters from the user via the user interface; and determining the list of one or more completion candidates by performing the one or more incremental searches with the one or more predictor models based in part or in whole upon the user input.

23. The computer program product of claim 19, wherein the one or more characteristics of the user from which the plurality of users separate from the user are identified include at least historical data previously entered by the user.

* * * * *